United States Patent [19]

Yoshimoto et al.

[11] Patent Number: 5,336,651

[45] Date of Patent: Aug. 9, 1994

[54] CATALYSTS AND METHODS FOR DENITRIZATION

[75] Inventors: Masafumi Yoshimoto; Tadao Nakatsuji; Hiromitsu Shimizu, all of Osaka, Japan

[73] Assignee: Sakai Chemical Industry Co., Ltd., Osaka, Japan

[21] Appl. No.: 84,332

[22] Filed: Jun. 30, 1993

Related U.S. Application Data

[63] Continuation of Ser. No. 693,295, May 1, 1991, abandoned.

[30] Foreign Application Priority Data

| | | | |
|---|---|---|---|
| May 3, 1990 | [JP] | Japan | 2-116365 |
| May 19, 1990 | [JP] | Japan | 2-129942 |
| May 19, 1990 | [JP] | Japan | 2-129943 |
| May 19, 1990 | [JP] | Japan | 2-129944 |
| May 23, 1990 | [JP] | Japan | 2-132850 |
| May 23, 1990 | [JP] | Japan | 2-132851 |
| May 26, 1990 | [JP] | Japan | 2-136177 |
| May 26, 1990 | [JP] | Japan | 2-136178 |

[51] Int. Cl.$^5$ ............... B01J 29/06; B01D 53/00
[52] U.S. Cl. ........................... 502/74; 502/66; 423/239.2
[58] Field of Search ............ 502/60, 66, 74; 423/213.2, 213.5, 239 Z, 239.1, 239.2

[56] References Cited

U.S. PATENT DOCUMENTS

| | | | |
|---|---|---|---|
| 4,372,842 | 2/1983 | Gardner | 423/239.2 |
| 4,973,399 | 11/1990 | Green et al. | 423/239 Z |
| 5,041,272 | 8/1991 | Tamura et al. | 423/239 |
| 5,164,350 | 11/1992 | Abe et al. | 502/66 |

FOREIGN PATENT DOCUMENTS

| | | | |
|---|---|---|---|
| 3036830 | 2/1988 | Japan | 423/239 |
| 2004453 | 1/1990 | Japan | 423/239 Z |
| 2187130 | 7/1990 | Japan | 423/239.2 |
| 2187131 | 7/1990 | Japan | 423/239 |
| 3270733 | 12/1991 | Japan | 423/239.2 |

*Primary Examiner*—Carl F. Dees
*Attorney, Agent, or Firm*—Wegner, Cantor, Mueller & Player

[57] ABSTRACT

A TiO$_2$ containing catalyst for denitrizing nitrogen oxides in the presence of a hydrocarbon as a reducing agent is disclosed. There are also disclosed denitrizing catalysts which contain zeolite or perovskite structure complex compound.

9 Claims, No Drawings

CATALYSTS AND METHODS FOR DENITRIZATION

This application is a continuation of U.S. application Ser. No. 07/693,295 filed May 1, 1991, and now abandoned.

FIELD OF THE INVENTION

This invention relates to a catalyst and a method for denitrization of nitrogen oxides contained in waste gas from, for example, plants or automobile engines.

DESCRIPTION OF PRIOR ART

There are already known a variety of methods for denitrization of nitrogen oxides contained in waste gas, among which are exemplarily a method wherein nitrogen oxides are oxidized and absorbed in an alkali solution. A further method is also known wherein nitrogen oxides are reduced to nitrogen using a reducing agent such as ammonia, hydrogen, carbon monoxide or hydrocarbons in the presence of a catalyst.

However, the former method requires treatment of the resultant alkaline waste water, and hence the method is costly, while the latter method has a disadvantage that when, for example, ammonia is used as a reducing agent, the ammonia reacts with sulfur oxides which are usually contained in the waste gas together with nitrogen oxides to form ammonium salts such as ammonium sulfate which deposit on the catalyst, decreasing the denitrizing activity of the catalyst during the denitrizing operations.

In turn, when hydrogen, carbon monoxide or hydrocarbons are used as a reducing gas, it predominantly reacts with oxygen usually present in a higher concentration than nitrogen oxides, so that a large amount of reducing gas is needed to effectively decompose the nitrogen oxides.

Therefore, a number of catalysts have also been proposed which decompose directly nitrogen oxides in the absence of a reducing agent, however, such catalysts have hitherto been found very low in denitrizing activity.

It is, therefore, an object of the invention to provide a denitrizing catalyst which selectively decomposes nitrogen oxides by the reaction of nitrogen oxides with a hydrocarbon as a reducing agent even in the presence of oxygen.

It is a further object of the invention to provide a method of denitrizing nitrogen oxides in the presence of such a catalyst using a hydrocarbon as a reducing agent.

According to the invention, there is provided a catalyst for denitrizing nitrogen oxides in the presence of a hydrocarbon as a reducing agent, which comprises:

(A) $TiO_2$: and
(B) at least one metal or one oxide of a metal selected from the group consisting of Pd, Ru, Rh, Ag and Pt supported on the $TiO_2$ in an amount of 0.1–10% by weight based on the catalyst.

Further objects and features of the invention will be apparent from the following description.

The denitrizing catalyst of the invention may be produced in any conventional manner. However, there may be preferably used anatase or rutile titanium dioxide which is produced by calcining metatitanic acid or orthotitanic acid at temperatures of 200°–1000° C. The metatitanic acid and orthotitanic acid may be produced by hydrolysis of such a titanium dioxide precursor as a titanium tetrachloride or titanium sulfate with an alkali such as ammonia, or by thermal hydrolysis of solution of the precursor.

Anatase titanium dioxide is more preferred, and most preferred is anatase titanium dioxide which is produced by thermally hydrolyzing titanium sulfate to provide water insoluble metatitanic acid containing sulfate ions therein, and then calcining the metatitanic acid at temperatures of 200°–800° C.

The catalyst of the invention has (B) at least one metal or one oxide of a metal selected from the group consisting of Pd, Ru, Rh, Ag and Pt supported on the $TiO_2$ (A) in an amount of 0.1–10% by weight based on the catalyst. If the amount is more than 10% by weight, there may not be obtained improvement in activity correspondingly, whereas when the amount is less than 0.1% by weight, the resultant catalyst may have a very small activity.

The catalyst of the invention may be formed into a desired shape, such as a honeycomb or granulate by any conventional method. The metal or its oxide (B) may be admixed and kneaded with a powder of titanium dioxide and then molded into a desired shape, or may be supported on molded articles of titanium dioxide.

There may be used a molding aid such as clay, a reinforcement such as inorganic oxide fibers or glass fibers, or an organic binder when the catalyst is formed into a shaped article. It is preferred that these additives are used in an amount of not more than 50% by weight based on the total weight of the catalyst and additives.

According to the invention, denitrization of nitrogen oxides is carried out by putting a waste gas which contains nitrogen oxides into contact with the catalyst in the presence of a hydrocarbon as a reducing agent. Any aliphatic, saturated or unsaturated, or aromatic hydrocarbon may be used. In general, the temperature at which nitrogen oxides selectively react with an alkyne, an alkene, an aromatic hydrocarbon or an alkane increases in this order. With homologous hydrocarbons, the more the carbons, the lower the temperature at which nitrogen oxides selectively react with the hydrocarbon.

Usually there may be used as a reducing agent a lower aliphatic alkyne such as acetylene, methylacetylene or 1-butyne, a lower aliphatic alkene such as ethylene, propylene, isobutylene, 1-butene or 2-butene, or a lower aliphatic diene such as butadiene or isoprene. Of course, a mixture of two ore more of the hydrocarbons may also be preferably used.

In a practical denitrization, a waste gas is admixed with a hydrocarbon, and put into contact with the catalyst at an elevated temperature. The hydrocarbon is used in a molar ratio of the hydrocarbon to the nitrogen oxides in the waste gas of about 0.1–2. When the molar ratio is less than 0.1, nitrogen oxides may not be effectively decomposed, whereas when the molar ratio is more than 2, unreacted hydrocarbon may stay correspondingly in the denitrided waste gas, and undesirable treatment of the unreacted hydrocarbon may be required.

The temperature at which selectively reduction of nitrogen oxides in a waste gas occurs is dependent upon the hydrocarbon and catalyst used, but it is usually in the range of 100°–800° C., preferably 200°–600° C. At such a temperature, the waste gas is put into contact with the catalyst preferably at a space velocity of 500–50000 $hr^{-1}$.

In accordance with the invention, there is provided a further catalyst which comprises:

(A) at least one oxide selected from the group consisting of $TiO_2$, $Al_2O_2$, $ZrO_2$ and $SiO_2$;

(B) at least one oxide of a rare earth metal; and (C) at least one metal or one oxide of a metal selected from the group consisting of Pd, Ru, Rh, Ag and Pt in an atomic ratio of A/B/C of 99-70/1-20/0.01-10.

In particular, there may be preferably used as an oxide of rare earth metal, for example, $Tb_4O_7$, $Sm_2O_3$, $Nd_2O_3$, $Pr_6O_{11}$ or $CeO_2$.

The catalyst may be produced by any conventional method. By way of example, an oxide (A) and an oxide (B) are mixed together and molded into a desired shape by, for example, extrusion, tabulation or granulation, and the molded product is calcined at 300°-800° C. Then the calcined product is immersed in an aqueous solution of a water soluble salt of the metal (C), dried, and calcined at 300°-800° C. If necessary, the calcination may be further carried out under a reductive atmosphere.

As a further method, an oxide (A) is dispersed in an aqueous solution of a water soluble salt of a rare earth metal, and an alkali is added to the mixture to provide a mixture of oxides of (A) and (B). After drying the mixture of oxides, the mixture is calcined and at least one metal or one oxide of a metal selected from the group consisting of Pd, Ru, Rh, Ag and Pt is supported on the mixture of oxides. Alternatively, the mixture of oxides (A) and (B) may be produced by preparing a solution containing both water soluble salts of, for example, titanium and a rare earth metal, and an alkali is added to the solution to form coprecipitates of oxides (A) and (B).

In the above mentioned preparation of catalyst, there may be used as a water soluble salt, for example, hydroxides, chlorides, sulfates or nitrates. More specifically, there may be mentioned, for example, ruthenium chloride, rhodium nitrate, palladium chloride, silver nitrate, chloroplatinic acid or chloroauric acid. There may be used as an alkali, for example, ammonia or sodium hydroxide.

A still further catalyst of the invention comprises:

(A) $TiO_2$;

(B) at least one oxide selected from the group consisting of $Al_2O_3$, $SiO_2$ and $ZrO_2$; and (C) at least one oxide of a metal selected from the group consisting of V, Cr, Mn, Fe, Co, Ni, Cu, Zn, Nb, Mo and W in an atomic ratio of A/B/C of 99-50/5-50/0.01-20.

The catalyst may be produced by any conventional method. By way of example, $TiO_2$ (A) and an oxide (B) are mixed together and molded into a desired shape by, for example, extrusion, tabulation or granulation, and the molded product is calcined at 300°-800° C. Then the calcined product is immersed in an aqueous solution of a water soluble salt of the metal (C), dried, and calcined at 300°-800° C. If necessary, the calcination may be further carried out under a reductive atmosphere.

As a further method, $TiO_2$ (A) is dispersed in an aqueous solution of a water soluble salt of Al, Si or Zr, and an alkali such as ammonia or sodium hydroxide is added to the mixture to provide a mixture of $TiO_2$ and the oxide (B). After drying the mixture of oxides, the mixture is calcined and at least one oxide of a metal (C) is supported on the mixture of oxides (A) and (B). Alternatively, the mixture of oxides (A) and (B) may be produced by preparing a solution containing water soluble salts of titanium and, for example, aluminum, and an alkali is added to the solution to form coprecipitates of $TiO_2$ (A) and (B).

When an aqueous solution of a salt of titanium is used for the preparation o catalyst, there may be used, for example, titanyl sulfate, titanium tetrachloride or titanic acid. In turn, there may be used as a water soluble salt of Al, Si or Zr, for example, hydroxides, nitrates, sulfates or chlorides. Regarding a water soluble salt of the metal (C), there may be preferably used nitrates, sulfates, chlorides or ammonium salts.

The catalyst may support at least one metal or one oxide of a metal selected from the group consisting of Ru, Rh, Pd, Ag or Pt, in place of the above component (C).

Thus, the catalyst comprises:

(A) $TiO_2$;

(B) at least one oxide selected from the group consisting of $Al_2O_3$, $SiO_2$ and $ZrO_2$; and (C) at least one oxide of a metal or a metal selected from the group consisting of Ru, Rh, Pd, Ag or Pt, in an atomic ratio of A/B/C of 9-50/5-50/0.01-10, preferably 90-75/10-25/0.5-10.

The catalyst may be produced by any conventional method as hereinbefore set forth. The atomic ratio of A/B/C may be preferably 90-75/10-25/0.1-5.

As a further aspect of the invention, there is provided a catalyst which comprises:

(A) a substituted zeolite having the general formula

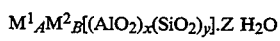

$M^1{}_A M^2{}_B [(AlO_2)_x (SiO_2)_y] \cdot Z\ H_2O$ in which $M^1$ represents an alkali metal ion or an alkaline earth metal ion or hydrogen ion; $M^2$ is at least one metal ion selected from the group consisting of $Ti^{4+}$, $Zr^{4+}$ and $Sn^{4+}$; $n_1A + n_2B = X$ wherein $n_1$ is a valency of the ion $M^1$ and $n_2$ is a valence of the ion $M^2$; and $Y/X \geq 5$; the $M^2$ ion being contained in an amount of 0.1–20% by weight based on the zeolite; and (B) at least one metal or an oxide of a metal selected from the group consisting of Pd and Pt supported on the substituted zeolite in an amount of 0.1–10% by weight based on the zeolite.

The substituted zeolite may be produced using a commercially available zeolite having the general formula

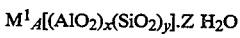

$M^1{}_A [(AlO_2)_x (SiO_2)_y] \cdot Z\ H_2O$ in which $M^1$ represents an alkali metal ion or an alkaline earth metal ion or hydrogen ion; $n_1A = X$ wherein $n_1$ is a valence of the ion $M^1$; and $Y/X \geq 5$, such as NM-100P (Na-type mordenite, $Y/X = 8$, Nippon Kagaku Kogyo K.K.), HM-100P (Na-type mordenite, $Y/X = 12$, Nippon Kagaku Kogyo K.K.) or ZSM-5 (Na-type, $Y/X = 35$, Nippon Mobile Shokubai).

A zeolite having a value of $Y/X \geq 5$ is used in the invention since a zeolite having a value of $Y/X < 5$ contains too a small amount of $SiO_2$ therein so that the zeolite is not sufficiently acid-resistant and the ion replacement by the $M^2$ ion will accompanied by difficulty.

The substituted zeolite may be obtained by replacing the $M^1$ ion in a starting zeolite partly or wholly by at least one metal ion selected from the group consisting of $Ti^{4+}$, $Zr^{4+}$ and $Sn^{4+}$. More specifically, by way of example, the starting zeolite is immersed in a solution containing $M^2$ ions at room temperature or elevated temperature, if necessary repeatedly, until desired substitution is completed.

The catalyst of the invention has (B) at least one metal or an oxide of a metal selected from the group consisting of Pd and Pt supported on the zeolite. For the preparation of catalyst, the substituted zeolite is immersed in an aqueous solution of a water soluble salt of Pd or Pt, such as palladium chloride or chloroplatinic acid, and the salt is reduced to a metal, when necessary.

According to the invention, there may be used a zeolite (C) which has at least one oxide selected from the group consisting of $TiO_2$, $ZrO_2$ and $SnO_2$ supported on the substituted zeolite. The starting zeolite having such an oxide supported thereon may also be used as the zeolite (C).

These zeolites carrying the oxide may be produced by immersing an unsubstituted zeolite or the substituted zeolite in an aqueous solution containing at least one ions selected from the group consisting of $Ti^{4+}$, $Zr^{4+}$ and $Sn^{4+}$, and then adding an alkali such as ammonia or sodium hydroxide under stirring to deposit hydroxides of the ions, followed by collecting the zeolite, washing with water, drying and calcining at 300°–700° C. to convert the hydroxide to oxide.

More specifically, the zeolite (C) may be prepared as follows, for example. The zeolite (A) is added to an aqueous solution of a water soluble titanium salt such as titanium tetrachloride, titanyl sulfate or titanium sulfate, a zirconium salt such as zirconium tetrachloride or sulfate, or a stannic salt such as stannic tetrachloride or sulfate, and the mixture is heated to hydrolyze the salt, thereby to deposit titanic acid, zirconic acid or stannic acid in micropores of the zeolite (A). In this method of preparation, a sulfate such as titanium sulfate, zirconium sulfate or stannic sulfate is most preferred as the water soluble salt since a zeolite (C) having a high solid acidity is obtained.

It is preferred that the zeolite carries such an oxide in an amount of 0.1–20% by weight in terms of metal based on the zeolite. When the amount of oxide is more than 20% by weight, the micropores of zeolite may be blocked to reduce the activity, whereas when the amount of oxide is less than 0.1% by weight, the resultant catalyst may have a very low activity.

A further catalyst may be obtained using the substituted zeolite in the same manner as above.

The catalyst comprises:

(A) a substituted zeolite having the general formula $$M^1{}_A M^2{}_B [(AlO_2)_x (SiO_2)_y] \cdot Z\ H_2O$$

in which $M^1$ represents an alkali metal ion or an alkaline earth metal ion or hydrogen ion; $M^2$ is at least one metal ion selected from the group consisting of $Ti^{4+}$, $Zr^{4+}$ and $Sn^{4+}$; $n_1 A + n_2 B = X$ wherein $n_1$ is a valence of the ion $M^1$ and $n_2$ is a valence of the ion $M^2$; and $Y/X \geq 5$; the $M^2$ ion being contained in an amount of 0.1–20% by weight based on the zeolite;

(B) at least one metal or an oxide of a metal selected from the group consisting of Ru, Rh and Ag supported on the substituted zeolite; and optionally (D) at least one metal or an oxide of a metal selected from the group consisting of Pd and Pt supported on the substituted zeolite; the metal or its oxide (B) and, the metal or its oxide (D) being contained in a total amount of 0.1–10% by weight based on the zeolite.

The catalyst has (B) at least one metal or an oxide of a metal selected from the group consisting of Ru, Rh and Ag supported on the substituted zeolite. For the preparation of catalyst, the substituted zeolite is immersed in an aqueous solution of a water soluble salt of Ru, Rh or Ag, such as ruthenium chloride, rhodium chloride or silver nitrate, and then the salt is reduced to metal with, for example, hydrazine.

As hereinbefore set forth, the substituted zeolite may have (C) at least one oxide selected from the group consisting of $TiO_2$, $ZrO_2$ and $SnO_2$ carried thereon preferably in an amount of 0.1–20% by weight in terms of metal based on the zeolite. Instead of the substituted zeolite, the starting zeolite having such an oxide supported thereon may also be used as well.

The catalyst may further support thereon (D) at least one metal or an oxide of a metal selected from the group consisting of Pd and Pt supported on the substituted zeolite. The metal or its oxide may be supported in the same manner as hereinbefore described.

The metal or its oxide (B) (and the metal or its oxide (D)) may be preferably supported on the zeolite in a total amount of 0.1–10% by weight based on the zeolite.

The substituted zeolite (A) having at least one oxide of a metal selected from the group consisting of V, Cr, Mn, Fe, Co, Ni, Cu, Zn, Nb, Mo and W (B) supported on the zeolite in an amount of 0.1–10% by weight based on the zeolite is also a catalyst according to the invention.

As hereinbefore set forth, the substituted zeolite may have (C) at least one oxide selected from the group consisting of $TiO_2$, $ZrO_2$ and $SnO_2$ carried thereon preferably in an amount of 0.1–20% by weight in terms of metal based on the zeolite. Instead of the substituted zeolite, the starting zeolite having such an oxide supported thereon may also be used as well.

As a still further aspect of the invention there is provided a catalyst which contains a perovskite structure complex compound.

Such a catalyst comprises a perovskite structure complex compound having the general formula $$La_x Sr_{(1-x)} B^1{}_Y B^2{}_{(1-Y)} O_3$$

wherein $B^1$ represents at least one metal selected from the group consisting of Mn and Co; $B^2$ represents at least one metal selected from the group consisting of Co, Fe, Ni, Cu and Cr; and $0 \leq X \leq 1$ and $0 \leq Y \leq 1$.

The above perovskite structure complex compound may be obtained by calcining a mixture of oxides and/or carbonates of metals to be contained in the perovskite structure complex compound. However, this method needs high temperature calcination, and has a tendency that it provides a perovskite structure complex compound having a small specific surface area. Therefore, it is preferred that the perovskite structure complex compound is produced by preparing an aqueous solution of salts of metals to be contained in the perovskite structure complex compound, concentrating the solution to dryness to solid, and then thermally decomposing the solid. As a further preferred method, an alkali is added to the solution to form coprecipitates of oxides of metals, and then the precipitate is thermally decomposed.

A more effective catalyst comprises the perovskite structure complex compound and and at least one metal or an oxide of a metal selected from the group consisting of Pt, Rh, Pd, Ru and Ag supported on the perovskite structure complex compound in an amount of 0.1–10% by weight based on the perovskite structure complex compound.

These catalysts may be supported on a conventional heat resistant carrier material such as alumina, silica, titanium dioxide or zirconium oxide, with the last two being preferred since the catalyst supported on these carrier materials have an especially high reduction activity. It is preferred that the catalyst is supported on the carrier material in an amount of not less than 1% by weight based on the carrier material.

By way of example, such a catalyst may be prepared as follows. As a first method, titanium dioxide or zirconium dioxide is impregnated with an aqueous solution of salts of metals to be contained in the perovskite structure complex compound and dried. After repeating this procedures when necessary, the oxide is calcined at a temperature of 500°-900° C. As a second method, titanium dioxide or zirconium dioxide is added to an aqueous solution of salts of metals to be contained in the perovskite structure complex compound, an alkali such as sodium carbonate is added to the mixture to form precipitates, and the resultant mixture of precipitates and titanium dioxide or zirconium dioxide is dried and thermally decomposed.

The invention will now be described with reference to examples, however, the invention is not limited thereto.

EXAMPLES—SECTION I

Preparation of Catalysts

EXAMPLE 1

A 500 g/l solution of titanyl sulfate ($TiOSO_4$) was placed in an autoclave and thermally hydrolyzed at 120° C. for one hour. The resultant metatitanic acid was collected by filtration, fully washed with deionized water, dried at 100° C. for 10 hours, and then calcined at 500° C. for three hours, to provide anatase titanium dioxide containing 8.5% by weight of sulfate ions and having a specific surface area of 114 $m^2/g$.

The titanium dioxide was immersed in an amount of one liter of aqueous solution of $H_2PtCl_6$ so that 1% by weight of Pt was supported on the resultant catalyst, and then hydrazine in an amount of 1.2 times the theoretical amount was added to the mixture under stirring to reduce $H_2PtCl_6$, to provide a Pt supporting catalyst (A-1).

EXAMPLE 2

Orthotitanic acid was produced in the same manner as in the Example 1 except that titanyl sulfate was neutralized with ammonia at normal temperature. The orthotitanic acid was treated in the same manner as in the Example 1 to provide titanium dioxide containing 0.21% by weight of sulfate ions and having a specific surface area of 85 $m^2/g$. Using this titanium dioxide, a catalyst (A-2) was prepared in the same manner as in the Example 1.

EXAMPLE 3

Orthotitanic acid produced in the Example 2 was calcined at 800° C. to provide titanium dioxide (mainly rutile) containing 0.01% by weight of sulfate ions and having a specific surface area of 13 $m^2/g$. Using this titanium dioxide, a catalyst (A-3) was prepared in the same manner as in the Example 1.

EXAMPLE 4

An aqueous solution of $RuCl_4.5H_2O$ was used in place of solution of $H_2PtCl_6$ so that 1% b weight of Ru was supported on the resultant catalyst, and otherwise in the same manner as in the Example 1, a catalyst (A-4) was prepared.

EXAMPLE 5

An aqueous solution of $PdCl_2$ was used in place of solution of $H_2PtCl_6$ so that 1% by weight of Pd was supported on the resultant catalyst, and otherwise in the same manner as in the Example 1, a catalyst (A-5) was prepared.

EXAMPLE 6

An aqueous solution of $H_2PtCl_6$ was used so that 0.5% by weight of Pt was supported on the resulting catalyst (A-6).

EXAMPLE 7

An aqueous solution of $H_2PtCl_6$ was used so that 2.0% by weight of Pt was supported on the resulting catalyst (A-7).

EXAMPLE 8

An aqueous solution of $AgNO_3$ was used in place of solution of $H_2PtCl_6$ so that 1% by weight of Ag was supported on the resultant catalyst, and otherwise in the same manner as in the Example 1, a catalyst (A-8) was prepared.

EXAMPLE 9

Using an aqueous solution of $PdCl_2$ and $AgNO_3$, there was prepared a catalyst (A-9) supporting 1% by weight of Pd and 1 by weight of Ag in the same manner as in the Example 1.

EXAMPLE 10

Using an aqueous solution of $H_2PtCl_6$ and $Rh_2(SO_4)_3$, there was prepared a catalyst (A-10) supporting 1% by weight of Pt and 1 by weight of Rh in the same manner as in the Example 1.

COMPARATIVE EXAMPLE 1

An amount of 3.13 g of $Al(NO_3)_3.9H_2O$ was placed in a beaker together with 100 ml of water. While dissolving the nitrate in water under stirring with a magnetic stirrer, 7.98 g of tetrapropylammonium chloride and 60 g of an aqueous silica sol solution (containing 31% by weight of $SiO_2$, 0.4% by weight of $Na_2O$ and 0.03% by weight of $Al_2O_3$) were added to the mixture to provide a solution.

A solution of 3.12 g of sodium hydroxide in 40 ml of water was then added gradually to the solution with stirring. The resultant mixture was placed in an autoclave and stirred at 160° C. for 72 hours to produce precipitates.

The precipitate was collected by filtration and washed with water to provide sodium type zeolite ZSM-5 ($SiO_2/Al_2O_3$ ratio:70). The zeolite was stirred in a 0.05 mol/l aqueous solution of cupric acetate overnight and then centrifuged. This operation was repeated three times and then washed with water five times, followed by drying at 110° C. overnight to provide a catalyst (B-1).

Denitrization Activity Measurement

A gas composed of 1% by volume of NO, 10% by volume of $O_2$, 1% by volume of reducing agent, and balance He was passed through the catalyst prepared in the Examples 1-10 and Comparative Example 1 at 200° C., 300° C., 400° C. or 500° C. at a space velocity of 1000 hr$^{-1}$. The conversion rate of NO to N$_2$ were measured by chromatography. The results are summarized in the Table 1.

TABLE 1

| Catalysts | Reducing Agent | Denitrizing Activity (%) at | | | |
|---|---|---|---|---|---|
| | | 200° C. | 300° C. | 400° C. | 500° C. |
| A-1 | Ethylene | 61.2 | 83.0 | 75.5 | 61.4 |
| A-1 | Propane | 57.6 | 72.9 | 65.4 | 48.1 |
| A-2 | Ethane | 22.3 | 51.1 | 47.3 | 39.5 |
| A-2 | Isobutylene | 45.4 | 61.8 | 57.7 | 48.3 |
| A-3 | Propylene | 11.5 | 23.0 | 14.3 | 9.9 |
| A-3 | trans-2-Butene | 14.2 | 26.6 | 21.0 | 10.6 |
| A-4 | Ethylene | 79.1 | 85.7 | 74.6 | 64.4 |
| A-4 | Ethane | 30.0 | 57.2 | 48.6 | 40.1 |
| A-5 | Acetylene | 62.3 | 71.1 | 62.1 | 52.8 |
| A-5 | 1-Butene | 81.3 | 89.7 | 80.4 | 74.2 |
| A-6 | Toluene | 56.3 | 72.9 | 69.5 | 50.6 |
| A-6 | cis-2-Butene | 71.3 | 81.8 | 76.8 | 50.0 |
| A-7 | Ethylene | 75.3 | 83.1 | 79.1 | 63.7 |
| A-7 | Propylene | 84.2 | 92.8 | 85.4 | 76.3 |
| A-8 | 1,3-Butadiene | 68.2 | 80.7 | 77.4 | 67.8 |
| A-8 | Propane | 31.6 | 51.4 | 55.8 | 42.7 |
| A-9 | Propylene | 81.2 | 87.9 | 83.0 | 76.8 |
| A-9 | Cyclobutane | 67.1 | 81.5 | 74.6 | 63.7 |
| A-10 | Propylene | 86.7 | 94.3 | 82.5 | 73.5 |
| B-1 | Propylene | 5.2 | 7.2 | 8.9 | 6.9 |

EXAMPLES—SECTION II

Preparation of Catalysts

EXAMPLE 1

Cerium nitrate (1 g in terms of CeO$_2$) was placed in a beaker together with 1 liter of water and 100 g of TiO$_2$, and the mixture was stirred to form an aqueous solution, and ammonia was added to the solution to form precipitates. The precipitates were collected by filtration, washed with water, dried, and calcined at 500° C. for three hours to provide a mixture of TiO$_2$ and CeO$_2$.

An amount of 50 g of the mixture of the oxides was immersed in one liter of aqueous solution of H$_2$PtCl$_6$ so that 1% by weight of Pt was supported on the resultant catalyst, and then hydrazine in an amount of 1.2 times the theoretical amount was added to the mixture under stirring to reduce H$_2$PtCl$_6$, to provide a catalyst (A-1).

EXAMPLE 2

An aqueous solution of PdCl$_2$ was used in place of solution H$_2$PtCl$_6$ so that 1% by weight of Pd was supported on the resultant catalyst, and otherwise in the same manner as in the Example 1, a catalyst (A-2) was prepared.

EXAMPLE 3

An amount of 100 g of Al$_2$O$_3$ was immersed in an aqueous solution of terbium nitrate (100 g/l in terms of Tb$_4$O$_7$), collected by filtration and dried. This operation was repeated three times, and the solid was calcined at 500° C. for three hours to provide a mixture of Al$_2$O$_3$ and 10.4% by weight of Tb$_4$O$_7$.

The mixture was immersed in an aqueous solution of H$_2$PtCl$_6$ (30 g/l in terms of Pt), air-dried at normal temperature, dried at 100° C. for 18 hours and calcined at 500° C. for three hours to provide a catalyst (A-3).

EXAMPLE 4

An amount of 100 g of Al$_2$O$_3$ was immersed in an aqueous solution of terbium nitrate (50 g/l in terms of Tb$_4$O$_7$), and otherwise in the same manner as in the Example 3, there was obtained a mixture of Al$_2$O$_3$ and 5.1% by weight of Tb$_4$O$_7$.

Pt was supported on the mixture in the same manner as in the Example 3 to provide a catalyst (A-4).

EXAMPLE 5

An amount of 100 g of SiO$_2$ was used in place of Al$_2$O$_3$, and otherwise in the same manner as in the Example 3, a catalyst (A-5) was prepared.

EXAMPLE 6

An aqueous solution of samarium nitrate (100 g/l in terms of Sm$_2$O$_3$) was used in place of aqueous solution of aqueous solution of terbium nitrate, and otherwise in the same manner as in the Example 3, a catalyst (A-6) was prepared.

EXAMPLE 7

An amount of 100 g of ZrO$_2$ was immersed in an aqueous solution of neodymium nitrate (100 g/l in terms of Nd$_2$O$_3$) and H$_2$PtCl$_6$ (10 g/l in terms of Pt), collected by filtration and dried. This operation was repeated three times, and the solid was calcined at 500° C. for three hours to provide a catalyst (A-7).

EXAMPLE 8

An amount of 100 g of TiO$_2$ was immersed in an aqueous solution of terbium nitrate (100 g/l in terms of Tb$_4$O$_7$) and H$_2$PtCl$_6$ (10 g/l in terms of Pt), collected by filtration and dried. This operation was repeated three times, and the solid was calcined at 500° C. for three hours to provide a catalyst (A-8).

EXAMPLE 9

An aqueous solution containing palladium chloride (10 g/l in terms of Pd) was used in place of H$_2$PtCl$_6$, and otherwise in the same manner as in the Example 8, a catalyst (A-9) was prepared.

EXAMPLE 10

An aqueous solution containing rhodium chloride (10 g/l in terms of Rh) was used in place of H$_2$PtCl$_6$, and otherwise in the same manner as in the Example 8, a catalyst (A-10) was prepared.

EXAMPLE 11

An aqueous solution containing ruthenium chloride (10 g/l in terms of Ru) was used in place of H$_2$PtCl$_6$, and otherwise in the same manner as in the Example 8, a catalyst (A-11) was prepared.

EXAMPLE 12

An aqueous solution containing silver nitrate (10 g/l in terms of Ag) was used in place of H$_2$PtCl$_6$, and otherwise in the same manner as in the Example 8, a catalyst (A-12) was prepared.

EXAMPLE 13

An aqueous solution containing praseodymium nitrate (100 g/l in terms of Pr) was used in place of terbium nitrate, and otherwise in the same manner as in the Example 8, a catalyst (A-13) was prepared.

COMPARATIVE EXAMPLE 1

Calcium carbonate was calcined at 650° C. for one hour to provide calcium oxide. Using this calcium oxide, a catalyst (B-1) was prepared in the same manner as in the Example 1.

COMPARATIVE EXAMPLE 2

Magnesium hydroxide was calcined at 650° C. for one hour to provide magnesium oxide. Using this magnesium oxide, a catalyst (B-2) was prepared in the same manner as in the Example 1.

COMPARATIVE EXAMPLE 3

A catalyst (B-3) was prepared in the same manner as in the Comparative Example 1 of the Section I.

Denitrization Activity Measurement

The denitrization activity of the catalyst prepared in the Examples 1–13 and Comparative Examples 1–3 was measured in the same manner as in the Section I. The results are shown in the Table 2.

TABLE 2

| Catalysts | Reducing Agent | Denitrizing Activity (%) at | | | |
|---|---|---|---|---|---|
| | | 200° C. | 300° C. | 400° C. | 500° C. |
| A-1 | Ethylene | 74.2 | 90.3 | 88.7 | 72.9 |
| A-1 | Propane | 25.1 | 35.8 | 26.5 | 19.8 |
| A-2 | Butane | 32.9 | 33.1 | 23.6 | 16.1 |
| A-2 | Acetylene | 28.2 | 47.5 | 45.8 | 26.4 |
| A-3 | 1-Butene | 62.3 | 71.9 | 59.4 | 44.7 |
| A-3 | Ethane | 23.6 | 31.1 | 24.3 | 17.7 |
| A-4 | Propylene | 45.8 | 56.9 | 46.1 | 28.3 |
| A-4 | Cyclobutane | 25.4 | 31.9 | 25.8 | 20.3 |
| A-5 | cis-2-Butene | 53.2 | 62.7 | 42.2 | 28.6 |
| A-5 | Propane | 22.3 | 31.6 | 23.2 | 16.4 |
| A-6 | trans-2-Butene | 57.1 | 66.9 | 45.8 | 31.7 |
| A-6 | Ethane | 22.8 | 30.4 | 23.9 | 16.8 |
| A-7 | Cyclopropane | 24.4 | 30.7 | 24.5 | 17.6 |
| A-7 | Isobutylene | 62.1 | 66.8 | 55.5 | 32.3 |
| A-8 | Toluene | 50.3 | 48.1 | 29.7 | 15.0 |
| A-8 | Propylene | 76.2 | 86.0 | 75.4 | 50.1 |
| A-9 | Ethylene | 59.0 | 73.2 | 71.9 | 57.3 |
| A-9 | Butane | 39.6 | 43.4 | 30.6 | 26.4 |
| A-10 | 1,3-Butadiene | 60.3 | 71.3 | 51.2 | 39.8 |
| A-10 | Ethane | 32.7 | 40.6 | 31.9 | 24.0 |
| A-11 | Propane | 21.8 | 30.3 | 22.1 | 16.0 |
| A-11 | 1-Butene | 46.4 | 57.2 | 43.7 | 21.8 |
| A-12 | Propylene | 69.9 | 80.8 | 68.3 | 46.4 |
| A-12 | Cyclobutane | 24.3 | 29.7 | 19.9 | 14.0 |
| A-13 | Acetylene | 23.1 | 42.8 | 41.5 | 21.6 |
| A-13 | trans-2-Butene | 60.3 | 70.4 | 49.7 | 35.0 |
| B-1 | cis-2-Butene | 0.4 | 3.8 | 3.4 | 1.9 |
| B-2 | Ethylene | 0.2 | 2.0 | 2.1 | 0.9 |
| B-3 | Propylene | 5.2 | 7.2 | 8.9 | 6.9 |

EXAMPLES—SECTION III

Preparation of Catalysts

EXAMPLE 1

An amount of 90 g of titanium sulfate in terms of oxide and 9 g of aluminum nitrate in terms of oxide were dissolved in one liter of deionized water. Ammonia was blown into the resultant solution under stirring for one hour to neutralize the solution until the pH of the solution reached 7.0, and stirring was continued for another 30 minutes. The resultant precipitates were collected by filtration, washed with water, dried at 100° C. over 18 hours and calcined at 500° C. for three hours. The calcined product was powdered with a sample mill provided with 0.5 mm screens. An amount of 50 g of the powder was slurried in 200 ml of water.

A corrugated honeycomb of ceramic fiber sheets having a void ratio of 81% and a pitch of 4 mm was immersed in the slurry to carry $TiO_2$ and $Al_2O_3$ thereon in a carrying rate of 143% by weight based on the honeycomb.

The honeycomb was air-dried at normal temperature, dried at 100° C. for 18 hours, immersed in an aqueous solution of copper (II) acetate (165 g/l in terms of CuO), air-dried at normal temperature, dried at 100° C. for 18 hours and then calcined at 500° C. for three hours to provide a catalyst (A-1).

EXAMPLE 2

An amount of 50 g of aluminum nitrate in terms of oxide and 50 g of oxyzirconium chloride in terms of oxide were dissolved in one liter of deionized water. Ammonia was blown into the resultant solution under stirring for one hour to neutralize the solution until the pH of the solution reached 7.0, and stirring was continued for another 30 minutes. The resultant precipitates were collected by filtration, washed with water, dried at 100° C. over 18 hours and calcined at 600° C. for three hours. The calcined product was powdered with a sample mill provided with 0.5 mm screens.

An amount of 50 g of the powder and 50 g of $TiO_2$ prepared by calcining titanium hydroxide at 500° C. for one hour were added to 400 ml of water and wet-pulverized to provide a slurry.

The same corrugated honeycomb as in the Example 1 was immersed in the slurry to carry $TiO_2$, $Al_2O_3$ and $ZrO_2$ thereon in a carrying rate of 156% by weight based on the honeycomb.

CuO was supported on the honeycomb in the same manner as in the Example 1 to provide a catalyst (A-2).

EXAMPLE 3

An aqueous solution of iron (III) nitrate (165 g/l in terms of $Fe_2O_3$) was used in place of solution of copper (II) nitrate, and otherwise in the same manner as in the Example 1, a catalyst (A-3) was prepared.

EXAMPLE 4

An aqueous solution of manganese nitrate (165 g/l in terms of $Mn_2O_3$) was used in place of solution of copper (II) nitrate, and otherwise in the same manner as in the Example 1, a catalyst (A-4) was prepared.

EXAMPLE 5

An aqueous solution of ammonium molybdate (165 g/l in terms of $MoO_3$) was used in place of solution of copper (II) nitrate, and otherwise in the same manner as in the Example 1, a catalyst (A-5) was prepared.

EXAMPLE 6

An aqueous solution of chromium nitrate (165 g/l in terms of $Cr_2O_3$) was used in place of solution of copper (II) nitrate, and otherwise in the same manner as in the Example 1, a catalyst (A-6) was prepared.

EXAMPLE 7

An aqueous solution of iron (III) nitrate (165 g/l in terms of $Fe_2O_3$) was used in place of solution of copper (II) nitrate, and otherwise in the same manner as in the Example 1, a catalyst (A-3) was prepared.

EXAMPLE 8

Silica sol (50 g in terms of $SiO_2$, Snowtex 0 by Nissan Kagaku Kogyo K.K.) and metatitanic acid sol (50 g in terms of $TiO_2$, produced by peptizing metatitanic acid with nitric acid) were admixed together, dried at 100° C. over 18 hours and then calcined at 700° C. for three hours. The calcined product was powdered in the same manner as in the Example 1.

Using the powder, a catalyst (A-8) was prepared in the same manner as in the Example 1.

EXAMPLE 9

An aqueous solution of ammonium metatungstate (165 g/l in terms of WO₃) was used in place of solution of copper (II) nitrate, and otherwise in the same manner as in the Example 8, a catalyst (A-9) was prepared.

EXAMPLE 10

An aqueous solution of cobalt nitrate (165 g/l in terms of CoO) was used in place of solution of copper (II) nitrate, and otherwise in the same manner as in the Example 8, a catalyst (A-10) was prepared.

EXAMPLE 11

An aqueous solution of zinc nitrate (165 g/l in terms of AnO) was used in place of solution of copper (II) nitrate, and otherwise in the same manner as in the Example 8, a catalyst (A-11) was prepared.

EXAMPLE 12

An aqueous solution of vanadyl oxalate (165 g/l in terms of $V_2O_5$) was used in place of solution of copper (II) nitrate, and otherwise in the same manner as in the Example 8, a catalyst (A-12) was prepared.

EXAMPLE 13

An aqueous solution of niobium oxalate (165 g/l in terms of $Nb_2O_5$) was used in place of solution of copper (II) nitrate, and otherwise in the same manner as in the Example 8, a catalyst (A-13) was prepared.

EXAMPLE 14

Silica sol (30 g in terms of $SiO_2$) and metatitanic acid sol (70 g in terms of $TiO_2$) were used, and otherwise in the same manner as in the Example 8, a catalyst (A-14) was prepared.

EXAMPLE 15

Silica sol (10 g in terms of $SiO_2$) and metatitanic acid sol (90 g in terms of $TiO_2$) were used, and otherwise in the same manner as in the Example 8, a catalyst (A-15) was prepared.

EXAMPLE 16

An aqueous solution of copper (II) nitrate (33 g/l in terms of CuO) was used, and otherwise in the same manner as in the Example 8, a catalyst (A-16) was prepared.

EXAMPLE 17

An aqueous solution of copper (II) nitrate (330 g/l in terms of CuO) was used, and otherwise in the same manner as in the Example 8, a catalyst (A-17) was prepared.

EXAMPLE 18

An aqueous solution of copper (II) nitrate (83 g/l in terms of CuO) and cobalt nitrate (83 g/l in terms of CoO) were used in place of solution of copper (II) nitrate, and otherwise in the same manner as in the Example 8, a catalyst (A-18) was prepared.

COMPARATIVE EXAMPLE 1

A catalyst (B-1) was prepared in the same manner as in the Comparative Example 1 of the Section II.

COMPARATIVE EXAMPLE 2

A catalyst (B-2) was prepared in the same manner as in the Comparative Example 2 of the Section I.

COMPARATIVE EXAMPLE 3

A catalyst (B-3) was prepared in the same manner as in the Comparative Example 1 of the Section I.

Denitrization Activity Measurement

The denitrization activity of the catalyst prepared in the Examples 1–18 and Comparative Examples 1–3 was measured at 300° C., 400° C., 500° C. or 600° C. in the same manner as in the Section I. The results are summarized in the Table 3.

TABLE 3

| Catalysts | Reducing Agent | Denitrizing Activity (%) at | | | |
|---|---|---|---|---|---|
| | | 300° C. | 400° C. | 500° C. | 600° C. |
| A-1 | Propylene | 89.5 | 92.1 | 90.7 | 63.4 |
| A-1 | Butane | 44.8 | 52.0 | 42.1 | 30.6 |
| A-2 | Ethane | 59.0 | 74.8 | 67.7 | 42.3 |
| A-2 | 1-Butene | 81.9 | 86.2 | 79.6 | 58.1 |
| A-3 | Acetylene | 57.3 | 72.1 | 80.4 | 71.0 |
| A-3 | Propane | 38.0 | 47.3 | 46.9 | 36.7 |
| A-4 | cis-2-Butene | 54.2 | 61.3 | 47.9 | 32.0 |
| A-4 | Cyclopropane | 57.1 | 71.5 | 64.6 | 53.7 |
| A-5 | Ethylene | 75.3 | 83.1 | 79.1 | 63.7 |
| A-5 | Toluene | 46.3 | 62.9 | 59.5 | 40.6 |
| A-6 | trans-2-Butene | 54.2 | 76.6 | 71.0 | 60.6 |
| A-6 | Propane | 36.9 | 46.4 | 45.1 | 34.3 |
| A-7 | 1,3-Butadiene | 68.2 | 80.7 | 77.4 | 67.8 |
| A-7 | Cyclobutane | 47.1 | 61.5 | 54.6 | 43.7 |
| A-8 | Isobutylene | 65.4 | 81.8 | 77.7 | 68.3 |
| A-8 | Ethene | 40.0 | 67.2 | 58.6 | 50.1 |
| A-9 | 1-Butene | 72.3 | 77.9 | 69.5 | 47.7 |
| A-9 | Ethylene | 74.4 | 82.6 | 77.9 | 52.7 |
| A-10 | Butane | 41.9 | 47.4 | 40.1 | 28.3 |
| A-10 | 1-Butene | 69.1 | 73.8 | 67.0 | 47.6 |
| A-11 | trans-2-Butene | 43.8 | 66.1 | 59.9 | 49.8 |
| A-11 | Acetylene | 34.2 | 48.0 | 56.3 | 46.7 |
| A-12 | cis-2-Butene | 52.9 | 59.8 | 45.3 | 29.6 |
| A-12 | Propane | 34.3 | 44.4 | 41.7 | 30.3 |
| A-13 | Ethylene | 68.3 | 76.2 | 70.3 | 56.2 |
| A-13 | Propane | 31.6 | 51.4 | 55.8 | 42.7 |
| A-14 | Isobutylene | 64.8 | 81.4 | 77.0 | 68.5 |
| A-14 | Ethane | 41.2 | 67.9 | 59.3 | 49.7 |
| A-15 | cis-2-Butene | 72.8 | 79.7 | 65.2 | 49.5 |
| A-15 | Cyclopropane | 72.1 | 86.5 | 79.6 | 58.7 |
| A-16 | Toluene | 46.0 | 61.8 | 58.4 | 40.3 |
| A-16 | trans-2-Butene | 44.4 | 68.3 | 60.2 | 48.5 |
| A-17 | Propylene | 92.4 | 95.3 | 91.8 | 75.4 |
| A-17 | Acetylene | 67.3 | 82.1 | 90.4 | 76.0 |
| A-18 | 1-Butene | 67.7 | 75.0 | 64.3 | 50.9 |
| A-18 | Propane | 42.9 | 53.6 | 51.2 | 40.8 |
| B-1 | cis-2-Butene | 3.8 | 3.4 | 1.9 | 0.5 |
| B-2 | Ethylene | 2.0 | 2.1 | 0.9 | 0.3 |
| B-3 | Propylene | 7.2 | 8.9 | 6.9 | 3.6 |

EXAMPLES—SECTION IV

Preparation of Catalysts

EXAMPLE 1

An amount of 90 g of titanium sulfate in terms of oxide and 9 g of aluminum nitrate in terms of oxide were dissolved in one liter of deionized water. Ammonia was blown into the resultant solution under stirring for one hour to neutralize the solution until the pH of the solution reached 7.0, and stirring was continued for another 30 minutes. The resultant precipitates were collected by filtration, washed with water, dried at 100° C. over 18 hours and calcined at 500° C. for three hours. The calcined product was powdered with a sample mill provided with 0.5 mm screens. An amount of 50 g of the powder was added to 200 ml of water to provide a slurry.

The same corrugated honeycomb of ceramic fiber sheets as hereinbefore described was immersed in the slurry to carry $TiO_2$ and $Al_2O_3$ thereon in a carrying rate of 143% by weight based on the honeycomb.

The honeycomb was air-dried at normal temperature, dried at 100° C. for 18 hours, immersed in an aqueous solution of chloroplatinic acid (33 g/l in terms of Pt), air-dried at normal temperature, dried at 100° C. for 18 hours and then calcined at 500° C. for three hours to provide a catalyst (A-1).

EXAMPLE 2

An amount of 50 g of aluminum nitrate in terms of oxide and 50 g of oxyzirconium chloride in terms of oxide were dissolved in one liter of deionized water. Ammonia was blown into the resultant solution under stirring for one hour to neutralize the solution until the pH of the solution reached 7.0, and stirring was continued for another 30 minutes. The resultant precipitates were collected by filtration, washed with water, dried at 100° C. over 18 hours and calcined at 600° C. for three hours. The calcined product was powdered with a sample mill provided with 0.5 mm screens.

An amount of 50 g of the powder and 50 g of $TiO_2$ prepared by calcining titanium hydroxide at 500° C. for one hour were added to 400 ml of water and wet-pulverized to provide a slurry.

The same corrugated honeycomb as above was immersed in the slurry to carry $TiO_2$, $Al_2O_3$ and $ZrO_2$ thereon in a carrying rate of 156% by weight based on the honeycomb.

The honeycomb was air-dried at normal temperature, dried at 100° C. for 18 hours, immersed in an aqueous solution of chloroplatinic acid (33 g/l in terms of Pt), air-dried at normal temperature, dried at 100° C. for 18 hours and then calcined at 500° C. for three hours, to provide a catalyst (A-2).

EXAMPLE 3

An aqueous solution of chloroplatinic acid (165 g/l in terms of Pt) was used, and otherwise in the same manner as in the Example 2, a catalyst (A-3) was prepared.

EXAMPLE 4

Aqueous solutions of palladium chloride (16 g/l, 33 g/l and 66 g/l, respectively) were used in place of solution of chloroplatinic acid, and otherwise in the same manner as in the Example 2, catalysts (A-4-1, A-4-2 and A-4-3, respectively) were prepared.

EXAMPLE 5

An aqueous solution of ruthenium chloride (33 g/l in terms of Ru) was used in place of solution of chloroplatinic acid, and otherwise in the same manner as in the Example 2, a catalyst (A-5) was prepared.

EXAMPLE 6

An aqueous solution of rhodium chloride (33 g/l in terms of Rh) was used in place of solution of chloroplatinic acid, and otherwise in the same manner as in the Example 2, a catalyst (A-6) was prepared.

EXAMPLE 7

An aqueous solution of silver nitrate (71 g/l in terms of $Ag_2O$) was used in place of solution of chloroplatinic acid, and otherwise in the same manner as in the Example 2, a catalyst (A-7) was prepared.

EXAMPLE 8

Silica sol (50 g in terms of $SiO_2$, Snowtex 0 by Nissan Kagaku Kogyo K.K.) and metatitanic acid sol (50 g in terms of $TiO_2$, produced by peptizing metatitanic acid with nitric acid) were admixed together, dried at 100° C. over 18 hours and then calcined at 700° C. for three hours. The calcined product was powdered in the same manner as in the Example 1.

Using the powder, a catalyst (A-8) was prepared in the same manner as in the Example 1.

EXAMPLE 9

An aqueous solution of palladium chloride was used in place of solution of chloroplatinic acid, and otherwise in the same manner as in the Example 8, a catalyst (A-9) was prepared.

EXAMPLE 10

An aqueous solution of rhodium nitrate was used in place of solution of chloroplatinic acid, and otherwise in the same manner as in the Example 8, a catalyst (A-10) was prepared.

EXAMPLE 11

Silica sol (30 g in terms of $SiO_2$, Snowtex 0) and metatitanic acid sol (70 g in terms of $TiO_2$) were used, and otherwise in the same manner as in the Example 8, a catalyst (A-11) was prepared.

EXAMPLE 12

Silica sol (10 g in terms of $SiO_2$, Snowtex 0) and metatitanic acid sol (90 g in terms of $TiO_2$) were used, and otherwise in the same manner as in the Example 8, a catalyst (A-12) was prepared.

COMPARATIVE EXAMPLE 1

A catalyst (B-1) was prepared in the same manner as in the Comparative Example 1 of the Section II.

COMPARATIVE EXAMPLE 2

A catalyst (B-2) was prepared in the same manner as in the Comparative Example 2 of the Section II.

COMPARATIVE EXAMPLE 3

A catalyst (B-3) was prepared in the same manner as in the Comparative Example 1 of the Section I.

Denitrization Activity Measurement

The denitrization activity of the catalyst prepared in the Examples 1-12 and Comparative Example 1-3 was measured at 200° C., 300° C., 400° C. or 500° C. in the same manner as in the Section I. The results are shown in the Table 4.

TABLE 4

| Catalysts | Reducing Agent | Denitrizing Activity (%) at | | | |
|---|---|---|---|---|---|
| | | 200° C. | 300° C. | 400° C. | 500° C. |
| A-1 | Ethane | 19.6 | 27.1 | 20.4 | 13.9 |
| A-1 | trans-2-Butene | 52.1 | 60.3 | 47.7 | 24.6 |
| A-2 | Ethylene | 59.3 | 75.2 | 60.4 | 31.8 |
| A-2 | Butane | 22.9 | 23.1 | 17.2 | 13.6 |
| A-3 | Ethylene | 71.9 | 87.5 | 86.3 | 70.4 |
| A-3 | 1,3-Butadiene | 80.3 | 91.3 | 71.2 | 49.8 |
| A-4-1 | Propylene | 35.8 | 46.9 | 36.1 | 18.3 |
| A-4-2 | Propylene | 66.2 | 81.4 | 67.0 | 33.8 |
| A-4-3 | Propylene | 79.6 | 90.8 | 80.5 | 52.1 |

TABLE 4-continued

| Catalysts | Reducing Agent | Denitrizing Activity (%) at | | | |
|---|---|---|---|---|---|
| | | 200° C. | 300° C. | 400° C. | 500° C. |
| A-5 | cis-2-Butene | 44.3 | 53.8 | 33.3 | 19.7 |
| A-5 | Acetylene | 23.1 | 42.8 | 41.5 | 21.6 |
| A-6 | Cyclobutane | 24.3 | 29.7 | 19.9 | 14.0 |
| A-6 | Isobutylene | 57.2 | 62.3 | 53.8 | 30.5 |
| A-7 | Ethylene | 51.9 | 67.5 | 66.3 | 50.4 |
| A-7 | Toluene | 47.5 | 46.1 | 30.7 | 13.9 |
| A-8 | Cyclopropane | 24.9 | 31.4 | 25.3 | 19.8 |
| A-8 | 1-Butene | 47.3 | 56.9 | 44.4 | 20.7 |
| A-9 | trans-2-Butene | 54.6 | 63.1 | 50.2 | 27.4 |
| A-9 | Propane | 21.1 | 30.3 | 22.6 | 15.9 |
| A-10 | Ethylene | 21.9 | 37.5 | 36.3 | 20.4 |
| A-10 | Butane | 19.8 | 21.7 | 15.3 | 13.2 |
| A-11 | Acetylene | 23.4 | 45.9 | 44.0 | 24.2 |
| A-11 | cis-2-Butene | 51.1 | 62.9 | 42.7 | 28.8 |
| A-12 | Ethane | 22.7 | 30.6 | 21.9 | 14.0 |
| A-12 | Isobutylene | 60.3 | 64.1 | 55.4 | 32.8 |
| B-1 | cis-2-Butene | 0.4 | 3.8 | 3.4 | 1.9 |
| B-2 | Ethylene | 0.2 | 2.0 | 2.1 | 0.9 |
| B-3 | Propylene | 5.2 | 7.2 | 8.9 | 6.9 |

EXAMPLES—SECTION V

Preparation of Catalysts

EXAMPLE 1

An amount of 100 g of Na-type mordenite (NM-100P, available from Nippon Kagaku Kogyo K.K.) having the formula

$Na_A[(AlO_2)_X(SiO_2)_Y]\cdot Z\, H_2O$ wherein Y/X=8, was immersed in one liter of an aqueous solution of $TiCl_4$ (0.025 mol/l) and stirred for 24 hours to replace Na ions by Ti ions, followed by collecting the zeolite, washing with water, dried, and calcined at 650° C. for four hours, thereby to provide a zeolite containing Ti in an amount of 0.4% by weight in terms of $TiO_2$ based on the zeolite.

The zeolite was immersed in an amount of one liter of aqueous solution of $H_2PtCl_6$ so that 1% by weight of Pt was supported on the resultant catalyst, and then hydrazine in an amount of 1.2 times the theoretical amount was added to the mixture under stirring to reduce $H_2PtCl_6$, to provide a catalyst (A-1) having Pt supported thereon.

EXAMPLE 2

After the ion substitution in the same manner as in the Example 1, excess titanium ions were neutralized with ammonia so that zeolite carried Ti in an amount of 2% by weight in terms of $TiO_2$. Then the zeolite was treated in the same manner as in the Example 1, and a catalyst (A-2) was prepared.

EXAMPLE 3

A hydrogen-type mordenite (HM-100P, available from Nippon Kagaku Kogyo K.K.) having the formula

$H_A[(AlO_2)_X(SiO_2)_Y]\cdot Z\, H_2O$ wherein Y/X=12 was used in place of HM-100P, and other wise in the same manner as in the Example 2, a catalyst (A-3) was prepared. The zeolite used was found to contain Ti of 2.8% by weight in terms of $TiO_2$.

EXAMPLE 4

An aqueous solution of $TiOSO_4$ was used in place of solution of $TiCl_4$, and otherwise in the same manner as in the Example 1, a catalyst (A-4) was prepared. The zeolite used was found to contain Ti of 0.7% by weight in terms of $TiO_2$.

EXAMPLE 5

An aqueous solution of $PdCl_2$ was used in place of solution of $H_2PtCl_6$, and otherwise in the same manner as in the Example 3, a catalyst (A-5) was prepared.

EXAMPLE 6

The same substituted zeolite as in the Example 3 was immersed in one liter of aqueous solution of $H_2PtCl_6$ so that 0.5% by weight of Pt was supported on the zeolite, and otherwise in the same manner as in the Example 3, a catalyst (A-6) was prepared.

EXAMPLE 7

The same substituted zeolite as in the Example 3 was immersed in one liter of aqueous solution of $H_2PtCl_6$ so that 2.0% by weight of Pt was supported on the zeolite, and otherwise in the same manner as in the Example 3, a catalyst (A-7) was prepared.

EXAMPLE 8

The same substituted zeolite as in the Example 5 was immersed in one liter of aqueous solution of $PdCl_2$ so that 0.5% by weight of Pd was supported on the zeolite, and otherwise in the same manner as in the Example 3, a catalyst (A-8) was prepared.

EXAMPLE 9

The same substituted zeolite as in the Example 5 was immersed in one liter of aqueous solution of $PdCl_2$ so that 2.0% by weight of Pd was supported on the zeolite, and otherwise in the same manner as in the Example 5, a catalyst (A-9) was prepared.

EXAMPLE 10

An aqueous solution of $TiCl_4$ (0.075 mol/l) was used, and otherwise in the same manner as in the Example 2, a zeolite containing ti in an amount of 7.3% by weight in terms of $TiO_2$ was prepared. Using this zeolite, there was prepared a catalyst (A-10) in the same manner as in Example 2.

EXAMPLE 11

An aqueous solution of $TiCl_4$ (0.15 mol/l) was used, and otherwise in the same manner as in the Example 2, a zeolite containing Ti in an amount of 16.7% by weight in terms of $TiO_2$ was prepared. Using this zeolite, there was prepared a catalyst (A-11) in the same manner as in Example 2.

EXAMPLE 12

An aqueous solution of $ZrCl_4$ (0.025 mol/l) was used in place of solution of $TiCl_4$, and otherwise in the same manner as in the Example 2, a zeolite containing Zr in an amount of 2.9% by weight in terms of $ZrO_2$ was prepared. Using this zeolite, there was prepared a catalyst (A-12) in the same manner as in Example 2.

EXAMPLE 13

An aqueous solution of $ZrCl_4$ (0.075 mol/l) was used in place of solution of $TiCl_4$, and otherwise in the same manner as in the Example 2, a zeolite containing Zr in an amount of 8.1% by weight in terms of $ZrO_2$ was prepared. Using this zeolite, there was prepared a catalyst (A-13) in the same manner as in Example 2.

EXAMPLE 14

An aqueous solution of SnCl$_4$ (0.025 mol/l) was used in place of solution of TiCl$_4$, and otherwise in the same manner as in the Example 2, a zeolite containing Sn in an amount of 3.2% by weight in terms of SnO$_2$ was prepared. Using this zeolite, there was prepared a catalyst (A-14) in the same manner as in Example 2.

EXAMPLE 15

An amount of 100 g of Na-type mordenite (ZSM-5, available from Nippon Mobile) having the formula Na$_A$[(AlO$_2$)$_x$(SiO$_2$)$_y$]·Z H$_2$O wherein Y/X=35, was immersen in one liter of an aqueous solution of TiOSO$_4$ (0.025 mol/l) and stirred. Then the mixture was placed in an autoclave and stirred while it is heated to 125° C. at a rate of 100° C./hr and maintained at the temperature for one hour to hydrolyze the TiOSO$_4$ and replace Na ions by Ti ions. The thus obtained substituted zeolite was collected by filtration, washed with water, dried, and calcined at 650° C. for four hours, thereby to provide a zeolite containing Ti in an amount of 2.4% by weight in terms of TiO$_2$ based on the zeolite.

Using this zeolite, there was prepared a catalyst (A-15) in the same manner as in Example 2.

COMPARATIVE EXAMPLE 1

An amount of 100 g of HM-100P was immersed in one liter of aqueous solution of H$_2$PtCl$_6$ so that 1% by weight of Pt was supported on the zeolite, and then hydrazine in an amount of 1.2 times the theoretical amount was added to the mixture under stirring to reduce H$_2$PtCl$_6$, to provide a catalyst (B-1) having Pt supported thereon.

COMPARATIVE EXAMPLE 2

An amount of 100 g of HM-100P was stirred in one liter of aqueous solution of PdCl$_2$ (0.42 g/l) for 24 hours to effect ion substitution to provide a zeolite (B-2) having 0.9% by weight of Pd thereon.

COMPARATIVE EXAMPLE 3

An amount of 100 g of HM-100P was stirred in one liter of aqueous solution of cupric acetate (0.05 mol/l) for overnight, and then centrifuged. After repeating this operation three times, the zeolite was washed with water five times and then dried at 110° C. overnight to provide a catalyst (B-3).

COMPARATIVE EXAMPLE 4

An amount of 3.13 g of Al(NO$_3$)$_3$·9H$_2$O was placed in a beaker together with 100 ml of water. While dissolving Al(NO$_3$)$_3$ in water under stirring with a magnetic stirrer, 7.98 g of tetrapropylammonium chloride and 60 g of an aqueous silica sol solution (containing 31% by weight of SiO$_2$, 0.4% by weight of Na$_2$O and 0.03% by weight of Al$_2$O$_3$) were added to the mixture, to provide a solution.

A solution of 3.12 g of sodium hydroxide in 40 ml of water was then added gradually to the solution with stirring. The resultant mixture was placed in an autoclave and stirred at 160° C. for 72 hours to produce precipitates.

The precipitate was collected by filtration and washed with water to provide sodium type zeolite ZSM-5 having a Y/X value of 35. The zeolite was stirred in a 0.05 mol/l aqueous solution of cupric acetate overnight and then centrifuged. This operation was repeated three times and then washed with water five times, followed by drying at 110° C. overnight to provide a catalyst (B-4).

COMPARATIVE EXAMPLE 5

An aqueous solution of TiCl$_4$ (0.50 mol/l) was used, and otherwise in the same manner as in the Example 2, a zeolite carrying Ti thereon in an amount of 31.4% by weight in terms of TiO$_2$ was prepared. Using this zeolite, there was prepared a catalyst (B-5) in the same manner as in Example 2.

COMPARATIVE EXAMPLE 6

An aqueous solution of ZrCl$_4$ (0.50 mol/l) was used in place of solution of TiCl$_4$, and otherwise in the same manner as in the Example 2, a zeolite carrying Zr in an amount of 37.1% by weight in terms of ZrO$_2$ was prepared. Using this zeolite, there was prepared a catalyst (B-6) in the same manner as in Example 2.

Denitrization Activity Measurement

The deritrization activity of the catalyst prepared in the Examples 1-15 and Comparative Examples 1-6 was measured in the same manner as in the Section I. The results are shown in the Table 5.

TABLE 5

| Catalysts | Reducing Agent | Denitrizing Activity (%) at | | | |
|---|---|---|---|---|---|
| | | 200° C. | 300° C. | 400° C. | 500° C. |
| A-1 | Ethylene | 31.9 | 51.2 | 33.7 | 15.6 |
| A-1 | Propane | 23.8 | 32.5 | 25.0 | 15.4 |
| A-2 | Ethane | 21.5 | 30.3 | 23.9 | 15.1 |
| A-2 | Isobutylene | 59.6 | 62.7 | 54.2 | 30.9 |
| A-3 | Propylene | 48.1 | 59.9 | 49.4 | 25.7 |
| A-3 | trans-2-Butene | 50.8 | 58.6 | 47.2 | 23.9 |
| A-4 | Ethylene | 48.7 | 63.9 | 59.7 | 32.1 |
| A-4 | Ethane | 20.3 | 28.8 | 21.5 | 14.2 |
| A-5 | Acetylene | 22.6 | 42.3 | 41.0 | 21.1 |
| A-5 | 1-Butene | 53.9 | 62.1 | 50.4 | 26.5 |
| A-6 | Toluene | 50.3 | 49.4 | 33.6 | 15.8 |
| A-6 | cis-2-Butene | 45.1 | 54.1 | 35.7 | 19.6 |
| A-7 | Ethylene | 51.9 | 67.5 | 66.3 | 50.4 |
| A-7 | Propylene | 62.4 | 78.7 | 64.1 | 35.6 |
| A-8 | 1,3-Butadiene | 46.0 | 55.2 | 36.9 | 20.5 |
| A-8 | Propane | 19.9 | 28.7 | 20.4 | 14.3 |
| A-9 | Propylene | 66.1 | 83.0 | 68.4 | 40.6 |
| A-9 | Cyclobutane | 44.3 | 53.8 | 33.3 | 19.7 |
| A-10 | Propylene | 63.4 | 79.7 | 57.0 | 43.8 |
| A-11 | Propylene | 65.1 | 64.6 | 49.2 | 37.6 |
| A-12 | Propylene | 44.7 | 59.8 | 34.3 | 31.7 |
| A-13 | Propylene | 70.1 | 83.5 | 68.4 | 44.9 |
| A-14 | Propylene | 60.2 | 63.7 | 48.0 | 38.8 |
| A-15 | Propylene | 71.1 | 82.3 | 51.9 | 47.2 |
| B-1 | Propylene | 5.1 | 7.2 | 4.7 | 2.1 |
| B-2 | Ethylene | 3.9 | 5.8 | 4.8 | 3.6 |
| B-3 | Isobutylene | 6.3 | 6.5 | 4.1 | 1.5 |
| B-4 | Propylene | 5.2 | 7.2 | 8.9 | 6.9 |
| B-5 | Propylene | 35.3 | 34.7 | 20.9 | 15.3 |
| B-6 | Propylene | 38.3 | 39.3 | 27.7 | 16.8 |

EXAMPLES—SECTION VI

Preparation of Catalysts

EXAMPLE 1

An amount of 100 g of Na-type mordenite (NM-100P, available from Nippon Kagaku Kogyo K.K.) having the formula Na$_A$[(AlO$_2$)$_x$(SiO$_2$)$_y$]·Z H$_2$O wherein Y/X=8, was immersen in one liter of an aqueous solution of TiCl$_4$ (0.025 mol/l) and stirred for 24 hours to replace Na ions by Ti ions, followed by collecting the zeolite, washing with water, dried, and calcined at 650° C. for four hours, thereby to provide a zeolite containing Ti in an amount of 0.4% by weight in terms of TiO$_2$ based on the zeolite.

The zeolite was immersed in an amount of one liter of aqueous solution of RuCl$_4$. 5H$_2$O so that 1% by weight of Ru was supported on the resultant catalyst, and then hydrazine in an amount of 1.2 times the theoretical amount was added to the mixture under stirring to reduce H$_2$PtCl$_6$, to provide a catalyst (A-1) having Ru supported thereon.

EXAMPLE 2

After the ion substitution in the same manner as in the Example 1, excess titanium ions were neutralized with ammonia so that zeolite carried Ti in an amount of 2% by weight in terms of TiO$_2$, and then the zeolite was treated in the same manner as in the Example 1, a catalyst (A-2) was prepared.

EXAMPLE 3

A hydrogen-type mordenite (HM-100P, available from Nippon Kagaku Kogyo K.K.) having the formula

$$H_4[(AlO_2)_x(SiO_2)_y] \cdot Z\ H_2O$$

wherein Y/X=12 was used in place of NM-100P, and otherwise in the same manner as in the Example 2, a catalyst (A-3) was prepared. The zeolite used was found to contain Ti in an amount of 2.8% by weight in terms of TiO$_2$.

EXAMPLE 4

An aqueous solution of TiOSO$_4$ was used in place of solution of TiCl$_4$, and otherwise in the same manner as in the Example 1, a catalyst (A-4) was prepared. The zeolite used was found to contain TiO$_2$ in an amount of 0.7% by weight.

EXAMPLE 5

An aqueous solution of Rh$_2$(SO$_4$)$_3$ was used in place of solution of ruthenium chloride, and otherwise in the same manner as in the Example 3, a catalyst (A-5) was prepared.

EXAMPLE 6

An aqueous solution of AgNO$_3$ was used in place of solution of ruthenium chloride, and otherwise in the same manner as in the Example 3, a catalyst (A-6) was prepared.

EXAMPLE 7

The same substituted zeolite as in the Example 3 was immersed in one liter of aqueous solution of H$_2$PtCl$_6$ and RuCl$_4$.5H$_2$O so that 0.5% by weight of Pt and 0.5% by weight of Ru were supported on the zeolite, and otherwise in the same manner as in the Example 3, a catalyst (A-7) was prepared.

EXAMPLE 8

The same substituted zeolite as in the Example 3 was immersed in one liter of aqueous solution of RuCl$_4$.5H$_2$O so that 2.0% by weight of Ru was supported on the zeolite, and otherwise in the same manner as in the Example 3, a catalyst (A-8) was prepared.

EXAMPLE 9

The same substituted zeolite as in the Example 5 was immersed in one liter of aqueous solution of Rh$_2$(SO$_4$)$_3$ so that 0.5% by weight of Rh was supported on the zeolite, and otherwise in the same manner as in the Example 5, a catalyst (A-9) was prepared.

EXAMPLE 10

The same substituted zeolite as in the Example 5 was immersed in one liter of aqueous solution of PdCl$_2$ and RuCl$_4$.5H$_2$O so that 1.0% by weight of Pd and 1.0% by weight of Ru were supported on the zeolite, and otherwise in the same manner as in the Example 5, a catalyst (A-10) was prepared.

EXAMPLE 11

The same substituted zeolite as in the Example 5 was immersed in one liter of aqueous solution of Rh$_2$(SO$_4$)$_3$ and AgNO$_3$ so that 0.5% by weight of Rh and 0.5% by weight of Ag were supported on the zeolite, and otherwise in the same manner as in the Example 5, a catalyst (A-11) was prepared.

EXAMPLE 12

An aqueous solution of TiCl$_4$ (0.075 mol/l) was used, and otherwise in the same manner as in the Example 2, there was prepared a zeolite containing Ti in an amount of 7.3% by weight in terms of TiO$_2$. Using this zeolite, there was prepared a catalyst (A-12) in the same manner as in the Example 2.

EXAMPLE 13

An aqueous solution of TiCl$_4$ (0.15 mol/l) was used, and otherwise in the same manner as in the Example 2, there was prepared a zeolite containing Ti in an amount of 16.7% by weight in terms of TiO$_2$. Using this zeolite, there was prepared a catalyst (A-13) in the same manner as in the Example 2.

EXAMPLE 14

An aqueous solution of ZrCl$_4$ (0.025 mol/l) was used in place of solution of TiCl$_4$, and otherwise in the same manner as in the Example 2, there was prepared a zeolite containing Zr of 2.9% by weight in terms of ZrO$_2$. Using this zeolite, there was prepared a catalyst (A-14) in the same manner as in the Example 2.

EXAMPLE 15

An aqueous solution of ZrCl$_4$ (0.075 mol/l) was used in place of solution of TiCl$_4$, and otherwise in the same manner as in the Example 2, there was prepared a zeolite containing Zr in an amount of 8.1% by weight in terms of ZrO$_2$. Using this zeolite, there was prepared a catalyst (A-15) in the same manner as in the Example 2.

EXAMPLE 16

An aqueous solution of SnCl$_4$ (0.025 mol/l) was used in place of solution of TiCl$_4$, and otherwise in the same manner as in the Example 2, there was prepared a zeolite containing Sn in an amount of 3.2% by weight in terms of SnO$_2$. Using this zeolite, there was prepared a catalyst (A-16) in the same manner as in the Example 2.

EXAMPLE 17

An amount of 100 g of Na-type mordenite (ZSM-5, available from Nippon Mobile) having the formula $Na_A[(AlO_2)_x(SiO_2)_y] \cdot Z\ H_2O$ wherein Y/X=35, was immersen in one liter of an aqueous solution of TiOSO$_4$ (0.025 mol/l) and stirred. Then the mixture was placed in an autoclave and stirred while it is heated to 125° C. at a rate of 100° C./hr and maintained at the temperature for one hour to hydrolyze the TiOSO$_4$ and replace Na ions by Ti ions. The thus obtained substituted zeolite was collected by filtration, washed with water, dried, and calcined at 650° C. for four hours, thereby to provide a zeolite containing Ti in an amount of 2.4% by weight in terms of TiO$_2$.

Using this zeolite, there was prepared a catalyst (A-17) in the same manner as in Example 2.

COMPARATIVE EXAMPLES 1–6

Catalysts (B-1 to B-6) were prepared in the same manner as in the Comparative Examples 1–6 of the Section V.

Denitrization Activity Measurement

The deritrization activity of the catalyst prepared in the Examples 1–17 and Comparative Examples 1–6 was measured in the same manner as in the Section I. The results are shown in the Table 6.

TABLE 6

| Catalysts | Reducing Agent | Denitrizing Activity (%) at | | | |
|---|---|---|---|---|---|
| | | 200° C. | 300° C. | 400° C. | 500° C. |
| A-1 | Ethylene | 41.7 | 62.2 | 52.1 | 23.4 |
| A-1 | Propane | 25.4 | 34.8 | 31.0 | 19.9 |
| A-2 | Ethane | 22.3 | 32.6 | 28.2 | 17.2 |
| A-2 | Isobutylene | 68.4 | 79.5 | 68.1 | 45.5 |
| A-3 | Propylene | 63.8 | 70.7 | 59.9 | 41.3 |
| A-3 | trans-2-Butene | 67.4 | 71.0 | 60.7 | 40.4 |
| A-4 | Ethylene | 70.2 | 78.4 | 63.3 | 48.7 |
| A-4 | Ethane | 16.3 | 37.8 | 31.4 | 21.6 |
| A-5 | Acetylene | 49.8 | 60.0 | 46.5 | 22.7 |
| A-5 | 1-Butene | 65.1 | 78.2 | 63.4 | 39.5 |
| A-6 | Toluene | 43.7 | 62.4 | 48.1 | 30.8 |
| A-6 | cis-2-Butene | 45.8 | 67.7 | 59.6 | 43.2 |
| A-7 | Ethylene | 71.2 | 84.3 | 73.6 | 59.4 |
| A-7 | Propylene | 77.0 | 87.5 | 79.0 | 63.2 |
| A-8 | 1,3-Butadiene | 67.4 | 78.2 | 66.7 | 48.6 |
| A-8 | Propane | 23.0 | 46.2 | 54.3 | 39.7 |
| A-9 | Propylene | 76.6 | 85.8 | 72.5 | 58.4 |
| A-9 | Cyclobutane | 54.6 | 70.5 | 72.2 | 59.7 |
| A-10 | Propylene | 65.0 | 79.4 | 51.0 | 33.4 |
| A-11 | Propylene | 50.8 | 74.2 | 78.9 | 41.6 |
| A-12 | Isobutylene | 72.8 | 91.2 | 83.6 | 61.7 |
| A-13 | Isobutylene | 78.1 | 93.6 | 86.8 | 52.2 |
| A-14 | Isobutylene | 82.9 | 92.1 | 84.5 | 63.4 |
| A-15 | Isobutylene | 87.4 | 95.0 | 81.5 | 53.8 |
| A-16 | Isobutylene | 81.7 | 85.2 | 67.3 | 42.6 |
| A-17 | Isobutylene | 86.5 | 90.5 | 71.6 | 59.3 |
| B-1 | Propylene | 5.1 | 7.2 | 4.7 | 2.1 |
| B-2 | Ethylene | 3.9 | 5.8 | 4.8 | 3.6 |
| B-3 | Isobutylene | 6.3 | 6.5 | 4.1 | 1.5 |
| B-4 | Propylene | 5.2 | 7.2 | 8.9 | 6.9 |
| B-5 | Isobutylene | 50.0 | 54.3 | 32.9 | 23.5 |
| B-6 | Isobutylene | 58.9 | 67.7 | 42.4 | 31.5 |

EXAMPLES—SECTION VII

Preparation of Catalysts

EXAMPLE 1

An amount of 100 g of Na-type mordenite (NM-100P, available from Nippon Kagaku Kogyo K.K.) having the formula $Na_A[(AlO_2)_x(SiO_2)_y] \cdot Z\ H_2O$ wherein Y/X=8, was immersen in one liter of an aqueous solution of TiCl$_4$ (0.025 mol/l) and stirred for 24 hours to replace Na ions by Ti ions, followed by collecting the zeolite, washing with water, dried, and calcined at 650° C. for four hours, thereby to provide a zeolite containing Ti in an amount of 0.4% by weight in terms of TiO$_2$ based on the zeolite.

An amount of 50 g of the zeolite was immersed in 500 ml of aqueous solution of cupric nitrate (15.2 g/l), and then an aqueous solution of sodium hydroxide was added until the mixture had a pH of 8 to form precipitates. The precipitate was collected by filtration, washed with water and calcined at 500° C. for three hours to provide a catalyst (A-1).

EXAMPLE 2

After the ion substitution in the same manner as in the Example 1, excess titanium ions were neutralized with ammonia so that zeolite carried Ti in an amount of 2% by weight in terms of TiO$_2$, and otherwise in the same manner as in the Example 1, a catalyst (A-2) was prepared.

EXAMPLE 3

A hydrogen-type mordenite (HM-100P, available from Nippon Kagaku Kogyo K.K.) having the formula $H_A[(AlO_2)_x(SiO_2)_y] \cdot Z\ H_2O$ wherein Y/X=12 was used in place of NM-100P, and otherwise in the same manner as in the Example 2, a catalyst (A-3) was prepared. The zeolite used was found to contain Ti in an amount of 2.8% by weight in terms of TiO$_2$.

EXAMPLE 4

An aqueous solution of TiOSO$_4$ was used in place of solution of TiCl$_4$, and otherwise in the same manner as in the Example 1, a catalyst (A-4) was prepared. The zeolite used was found to contain Ti in an amount of 0.7% by weight in terms of TiO$_2$.

EXAMPLE 5

An aqueous solution of iron (III) nitrate (25.3 g/l) was used in place of solution of copper (II) nitrate, and otherwise in the same manner as in the Example 3, a catalyst (A-5) was prepared.

EXAMPLE 6

An aqueous solution of cobalt nitrate (18.2 g/l) was used in place of solution of copper (II) nitrate, and otherwise in the same manner as in the Example 3, a catalyst (A-6) was prepared.

EXAMPLE 7

An aqueous solution of nickel nitrate (19.5 g/l) was used in place of solution of copper (II) nitrate, and otherwise in the same manner as in the Example 3, a catalyst (A-7) was prepared.

EXAMPLE 8

An aqueous solution of manganese nitrate (18.2 g/l) was used in place of solution of copper (II) nitrate, and otherwise in the same manner as in the Example 3, a catalyst (A-8) was prepared.

EXAMPLE 9

An aqueous solution of zinc nitrate (18.3 g/l) was used in place of solution of copper (II) nitrate, and otherwise in the same manner as in the Example 3, a catalyst (A-9) was prepared.

EXAMPLE 10

An aqueous solution of chromium nitrate (26.3 g/l) was used in place of solution of copper (II) nitrate, and otherwise in the same manner as in the Example 3, a catalyst (A-10) was prepared.

EXAMPLE 11

An amount of 50 g of the same substituted zeolite as in the Example 3 was immersed in one liter of aqueous solution of vanadyl oxalate (142 g/l in terms of $V_2O_5$), excess solution was removed, dried, and then calcined at 500° C. for three hours to provide a catalyst (A-11).

EXAMPLE 12

An aqueous solution of ammonium metatungstate (142 g/l in terms of $WO_3$) was used in place of solution of vanadyl oxalate, and otherwise in the same manner as in the Example 11, a catalyst (A-12) was prepared.

EXAMPLE 13

An aqueous solution of ammonium molybdate (142 g/l in terms of $MoO_3$) was used in place of solution of vanadyl oxalate, and otherwise in the same manner as in the Example 11, a catalyst (A-13) was prepared.

EXAMPLE 14

An aqueous solution of niobium oxalate (142 g/l in terms of $Nb_2O_5$) was used in place of solution of vanadyl oxalate, and otherwise in the same manner as in the Example 11, a catalyst (A-14) was prepared.

EXAMPLE 15

An aqueous solution of (II) nitrate (7.6 g/l) was used, and otherwise in the same manner as in the Example 3, a catalyst (A-15) was prepared.

EXAMPLE 16

An aqueous solution of copper (II) nitrate (30.4 g/l) was used, and otherwise in the same manner as in the Example 3, a catalyst (A-16) was prepared.

EXAMPLE 17

An aqueous solution of copper (II) nitrate (7.6 g/l) and cobalt nitrate (9.1 g/l) was used in place of solution of copper (II) nitrate (15.2 g/l), and otherwise in the same manner as in the Example 3, a catalyst (A-17) was prepared.

EXAMPLE 18

An aqueous solution of $TiCl_4$ (0.075 mol/l) was used, and otherwise in the same manner as in the Example 2, there was prepared a zeolite containing Ti in an amount of 7.3% by weight in terms of $TiO_2$. Using this zeolite, there was prepared a catalyst (A-18) in the same manner as in the Example 2.

EXAMPLE 19

An aqueous solution of $TiCl_4$ (0.15 mol/l) was used, and otherwise in the same manner as in the Example 2, there was prepared a zeolite containing Ti in an amount of 16.7% by weight in terms of $TiO_2$. Using this zeolite, there was prepared a catalyst (A-19) in the same manner as in the Example 2.

EXAMPLE 20

An aqueous solution of $ZrCl_4$ (0.025 mol/l) was used in place of solution of $TiCl_4$, and otherwise in the same manner as in the Example 2, there was prepared a zeolite containing Zr in an amount of 2.9% by weight in terms of $ZrO_2$. Using this zeolite, there was prepared a catalyst (A-20) in the same manner as in the Example 2.

EXAMPLE 21

An aqueous solution of $ZrCl_4$ (0.075 mol/l) was used in place of solution of $TiCl_4$, and otherwise in the same manner as in the Example 2, there was prepared a zeolite containing Zr in an amount of 8.1% by weight in terms of $ZrO_2$. Using this zeolite, there was prepared a catalyst (A-21) in the same manner as in the Example 2.

EXAMPLE 22

An aqueous solution of $SnCl_4$ (0.025 mol/l) was used in place of solution of $TiCl_4$, and otherwise in the same manner as in the Example 2, there was prepared a zeolite containing Sn in an amount of 3.2% by weight in terms of $SnO_2$. Using this zeolite, there was prepared a catalyst (A-22) in the same manner as in the Example 2.

EXAMPLE 23

An amount of 100 g of Na-type mordenite (ZSM-5, available from Nippon Mobile) having the formula $$Na_A[(AlO_2)_x(SiO_2)_y] \cdot Z\ H_2O$$

wherein $Y/X=35$, was immersed in one liter of an aqueous solution of $TiOSO_4$ (0.025 mol/l) and stirred. Then the mixture was placed in an autoclave and stirred while it is heated to 125° C. at a rate of 100° C./hr and maintained at the temperature for one hour to hydrolyze the $TiOSO_4$ and replace Na ions by Ti ions. The thus obtained substituted zeolite was collected by filtration, washed with water, dried, and calcined at 650° C. for four hours, thereby to provide a zeolite containing Ti in an amount of 2.4% by weight in terms of $TiO_2$.

Using this zeolite, there was prepared a catalyst (A-23) in the same manner as in Example 2.

COMPARATIVE EXAMPLE 1

A catalyst (B-1) was prepared in the same manner as in the Comparative Example 1 of the Section II.

COMPARATIVE EXAMPLE 2

A catalyst (B-2) was prepared in the same manner as in the Comparative Example 2 of the Section II.

COMPARATIVE EXAMPLE 3

A catalyst (B-3) was prepared in the same manner as in the Comparative Example 4 of the Section V.

COMPARATIVE EXAMPLE 4

An aqueous solution of $TiCl_4$ (0.50 mol/l) was used, and otherwise in the same manner as in the Example 2, there was prepared a zeolite containing Ti in an amount of 31.4% by weight in terms of $TiO_2$. Using this zeolite, there was prepared a catalyst (B-4) in the same manner as in the Example 2.

COMPARATIVE EXAMPLE 5

An aqueous solution of $ZrCl_4$ (0.50 mol/l) was used in place of solution of $TiCl_4$, and otherwise in the same manner as in the Example 2, there was prepared a zeolite containing Ti in an amount of 37.1% by weight in terms of $ZrO_2$. Using this zeolite, there was prepared a catalyst (B-5) in the same manner as in the Example 2.

Denitrization Activity Measurement

The deritrization activity of the catalyst prepared in the Examples 1–23 and Comparative Examples 1–5 was measured at 300° C., 400° C., 500° C. or 600° C. in the same manner as in the Section I. The results are shown in the Table 7.

TABLE 7

| Catalysts | Reducing Agent | Denitrizing Activity (%) at | | | |
|---|---|---|---|---|---|
| | | 300° C. | 400° C. | 500° C. | 600° C. |
| A-1 | Ethane | 49.0 | 64.8 | 57.7 | 32.3 |
| A-1 | Propylene | 89.5 | 92.1 | 90.7 | 63.4 |
| A-2 | Butane | 45.3 | 52.7 | 42.8 | 31.5 |
| A-2 | Acetylene | 57.1 | 71.8 | 79.9 | 70.6 |
| A-3 | Propane | 53.0 | 62.3 | 61.9 | 51.7 |
| A-3 | 1-Butene | 91.9 | 96.2 | 89.6 | 68.1 |
| A-4 | Cyclopropane | 47.1 | 62.0 | 53.9 | 42.1 |
| A-4 | trans-2-Butene | 69.2 | 90.8 | 86.3 | 78.8 |
| A-5 | Ethane | 40.0 | 66.7 | 57.4 | 48.5 |
| A-5 | Toluene | 44.8 | 62.1 | 58.3 | 39.7 |
| A-6 | Cyclopropane | 55.4 | 69.9 | 60.8 | 49.2 |
| A-6 | Isobutylene | 62.3 | 79.4 | 74.2 | 61.5 |
| A-7 | trans-2-Butene | 43.5 | 49.0 | 36.3 | 25.1 |
| A-7 | Propane | 36.9 | 46.4 | 45.1 | 34.3 |
| A-8 | Propylene | 69.5 | 78.1 | 77.7 | 41.6 |
| A-8 | Butane | 40.7 | 46.7 | 36.1 | 25.4 |
| A-9 | cis-2-Butene | 54.2 | 61.7 | 47.3 | 30.7 |
| A-9 | Acetylene | 39.3 | 53.2 | 61.4 | 50.9 |
| A-10 | Ethylene | 55.3 | 63.1 | 59.1 | 43.7 |
| A-10 | Cyclobutane | 46.2 | 60.7 | 51.3 | 39.9 |
| A-11 | Propylene | 71.3 | 79.6 | 78.7 | 45.0 |
| A-11 | Ethane | 37.3 | 62.9 | 55.6 | 47.1 |
| A-12 | Ethylene | 51.2 | 60.9 | 56.3 | 39.4 |
| A-12 | Toluene | 36.1 | 52.7 | 49.3 | 30.8 |
| A-13 | 1-Butene | 62.5 | 68.4 | 58.0 | 40.3 |
| A-13 | Cyclobutane | 46.3 | 60.8 | 51.2 | 39.9 |
| A-14 | Acetylene | 34.2 | 47.6 | 55.5 | 46.3 |
| A-14 | cis-2-Butene | 58.4 | 66.1 | 52.6 | 33.8 |
| A-15 | Propylene | 76.3 | 84.1 | 82.7 | 50.6 |
| A-15 | Butane | 30.2 | 34.8 | 28.4 | 20.1 |
| A-16 | Ethane | 61.1 | 75.4 | 68.4 | 42.9 |
| A-16 | trans-2-Butene | 79.6 | 95.0 | 90.3 | 83.9 |
| A-17 | Isobutylene | 80.1 | 60.6 | 58.3 | 47.2 |
| A-17 | Propane | 51.4 | 60.6 | 58.3 | 47.2 |
| A-18 | Propylene | 87.3 | 91.0 | 89.9 | 60.3 |
| A-19 | Propylene | 86.6 | 89.5 | 84.6 | 49.8 |
| A-20 | Propylene | 90.4 | 93.3 | 91.2 | 67.6 |
| A-21 | Propylene | 90.8 | 93.9 | 91.1 | 66.9 |
| A-22 | Propylene | 84.3 | 82.2 | 70.9 | 48.6 |
| A-23 | Propylene | 88.2 | 93.1 | 92.3 | 78.2 |
| B-1 | cis-2-Butene | 3.8 | 3.4 | 1.9 | 0.5 |
| B-2 | Ethylene | 2.0 | 2.1 | 0.9 | 0.3 |
| B-3 | Propylene | 7.2 | 8.9 | 6.9 | 3.6 |
| B-4 | Propylene | 43.2 | 53.1 | 28.8 | 16.9 |
| B-5 | Propylene | 48.2 | 64.7 | 42.5 | 20.0 |

EXAMPLES—SECTION VIII

Preparation of Catalysts

EXAMPLE 1

An amount of 69.3 g of $La(NO_3)_3.6H_2O$, 50.8 g of $Sr(NO_3)_2$, 91.9 g of $Mn(NO_3)_2.6H_2O$ and 32.3 g of $Fe(NO_3)_3.9H_2O$ were placed in a beaker together with one liter of water and stirred to form an aqueous solution containing La, Sr, Mn and Fe in an atomic ratio of 4/6/8/2.

Ab aqueous solution of sodium carbonate (250 g/l) was added to the solution until the pH reached 8 whereupon precipitates were formed. The precipitate was washed with water, dried at 110° C. and calcined at 800° C. for three hours to provide a catalyst (A-1).

EXAMPLE 2

An amount of 138.6 g of $La(NO_3)_3.6H_2O$, 16.9 g of $Sr(NO_3)_2$, 93.1 g of $Co(NO_3)_2.6H_2O$ and 23.3 g of $Ni(NO_3)_2.6H_2O$ were placed in a beaker together with one liter of water and stirred to form an aqueous solution containing La, Sr, Co and Ni in an atomic ratio of 8/2/8/2.

Using this solution, a catalyst (A-2) was prepared in the same manner as in the Example 1.

EXAMPLE 3

An amount of 173.2 g of $La(NO_3)_3.6H_2O$, 91.9 g of $Mn(NO_3)_2.6H_2O$ and 19.3 g of $Cu(NO_3)_2.3H_2O$ were placed in a beaker together with one liter of water and stirred to form an aqueous solution containing La, Mn and Cu in an atomic ratio of 10/8/2.

Using this solution, a catalyst (A-3) was prepared in the same manner as in the Example 1.

EXAMPLE 4

An amount of 84.7 g of $Sr(NO_3)_2$, 69.8 g of $Co(NO_3)_2.6H_2O$ and 64.0 g of $Cr(NO_3)_3.9H_2O$ were placed in a beaker together with one liter of water and stirred to form an aqueous solution containing Sr, Co and Cr in an atomic ratio of 10/6/4.

Using this solution, a catalyst (A-3) was prepared in the same manner as in the Example 1.

EXAMPLE 5

An amount of 14.7 g of $La(NO_3)_3.6H_2O$, 1.8 g of $Sr(NO_3)$ and 12.4 g of $Co(NO_3)_2.6H_2O$ were placed in a beaker together with one liter of water and stirred to form an aqueous solution containing La, Sr and Co in an atomic ratio of 8/2/10.

An amount of 100 g of $TiO_2$ powder and then an aqueous solution of sodium carbonate (250 g/l) was added to the solution until the pH reached 8 whereupon precipitates were formed. The precipitate was washed with water, dried at 110° C. and calcined at 800° C. for three hours to provide a catalyst (A-5).

EXAMPLE 6

An amount of 129.9 g of $La(NO_3)_3.6H_2O$, 42.3 g of $Sr(NO_3)$, 116.4 g of $Co(NO_3)_2.6H_2O$ and 28.7 g of $Mn(NO_3)_2.6H_2O$ were placed in a beaker together with one liter of water stirred to form an aqueous solution.

A $ZrO_2$ powder was immpregnated with the solution, excess solution was removed and dried. After repeating the operation three times, the powder was calcined at 800° C. for three hours to provide a catalyst (A-6).

EXAMPLE 7

The catalyst (A-1) was added in an aqueous solution of $H_2PtCl_6$ so that 1% by weight of Pt was supported on the catalyst and hydrazine in an amount of 1.2 times the theoretical amount was added to the solution to reduce $H_2PtCl_6$ to provide a catalyst (A-7) having Pt supported thereon.

EXAMPLE 8

The catalyst (A-5) was added in an aqueous solution of $RhCl_3$ so that 1% by weight of Rh was supported on the catalyst and hydrazine in an amount of 1.2 times the theoretical amount was added to the solution to reduce $RhCl_3$ to provide a catalyst (A-8) having Rh supported thereon.

COMPARATIVE EXAMPLE 1

A catalyst (B-1) was prepared in the same manner as in the Comparative Example 1 of the Section II.

COMPARATIVE EXAMPLE 2

A catalyst (B-2) was prepared in the same manner as in the Comparative Example 2 of the Section II.

COMPARATIVE EXAMPLE 3

A catalyst (B-3) was prepared in the same manner as in the Comparative Example 4 of the Section V.

Denitrization Activity Measurement

The denitrization activity of the catalyst prepared in the Examples 1–8 and Comparative Example 1–3 was measured in the same manner as in the Section I. The results are shown in the Table 8.

TABLE 8

| Catalysts | Reducing Agent | Denitrizing Activity (%) at | | | |
|---|---|---|---|---|---|
| | | 200° C. | 300° C. | 400° C. | 500° C. |
| A-1 | Ethane | 15.3 | 21.7 | 27.4 | 23.1 |
| A-1 | Propylene | 30.9 | 41.2 | 39.5 | 29.8 |
| A-2 | 1-Butene | 33.7 | 46.3 | 36.9 | 25.4 |
| A-2 | Propane | 19.6 | 27.1 | 32.3 | 24.9 |
| A-3 | Cyclobutane | 19.6 | 22.1 | 17.3 | 12.6 |
| A-3 | Propylene | 27.3 | 37.4 | 33.8 | 26.2 |
| A-4 | Ethane | 12.7 | 18.1 | 23.6 | 19.2 |
| A-4 | trans-2-Butene | 26.4 | 39.9 | 29.2 | 18.7 |
| A-5 | Ethylene | 40.9 | 54.8 | 62.3 | 53.2 |
| A-5 | Butane | 21.6 | 30.3 | 25.2 | 18.8 |
| A-6 | cis-2-Butene | 63.4 | 71.1 | 64.2 | 56.8 |
| A-6 | Acetylene | 44.7 | 51.9 | 58.8 | 49.3 |
| A-7 | trans-2-Butene | 76.1 | 84.8 | 79.7 | 68.4 |
| A-7 | Cyclopropane | 45.2 | 63.7 | 70.2 | 61.9 |
| A-8 | Isobutylene | 81.2 | 92.5 | 85.4 | 70.7 |
| A-8 | Toluene | 77.4 | 86.8 | 74.9 | 63.2 |
| B-1 | cis-2-Butene | 0.4 | 3.8 | 3.4 | 1.9 |
| B-2 | Ethylene | 0.2 | 2.0 | 2.1 | 0.9 |
| B-3 | Propylene | 5.2 | 7.2 | 8.9 | 6.9 |

What is claimed is:

1. A catalyst for denitrizing nitrogen oxides in the presence of a hydrocarbon as a reducing agent, which comprises:

(A) a substituted zeolite having the general formula $$M^1{}_A M^2{}_B[(AlO_2)_x(SiO_2)_Y] \cdot Z\ H_2O$$

in which $M^1$ represents an alkali metal ion or an alkaline earth metal ion or hydrogen ion having a valence of $n_1$; $M^2$ is at least one metal ion selected from the group consisting of $Ti^{4+}$, $Zr^{4+}$ and $Sn^{4+}$ having a valence of $N_2$; $n_1A + n_2B = X$ and $Y/X \geq 5$; the $M^2$ ion being contained in an amount of 0.1–20% by weight based on the zeolite; and (B) at least one metal or an oxide of a metal selected from the group consisting of Pd and Pt supported on the substituted zeolite in an amount of 0.1–10% by weight based on the zeolite.

2. The catalyst as claimed in claim 1 which further comprises at least one oxide selected from the group consisting of $TiO_2$, $ZrO_2$ and $SnO_2$ supported on the zeolite in an amount of 0.1–20% by weight in terms of metal based on the zeolite.

3. A catalyst for denitrizing nitrogen oxides in the presence of a hydrocarbon as a reducing agent, which comprises:

(A) a zeolite having the general formula $$M^1{}_A[(AlO_2)_x(SiO_2)_Y] \cdot Z\ H_2O$$

in which $M^1$ represents an alkali metal ion or an alkaline earth metal ion or hydrogen ion having a valence of $n_1$; $n_1A = X$; and $Y/S \geq 5$;

(B) at least one oxide selected from the group consisting of $TiO_2$, $ZrO_2$ and $SnO_2$ supported on the zeolite in an amount of 0.1–20% by weight in terms of metal based on the zeolite; and (C) at least one metal or an oxide of a metal selected from the group consisting of Pd and Pt supported on the substituted zeolite in an amount of 0.1–10% by weight based on the zeolite.

4. A catalyst for denitrizing nitrogen oxides in the presence of a hydrocarbon as a reducing agent, which comprises:

(A) a substituted zeolite having the general formula $$M^1{}_A M^2{}_B[(AlO_2)_x(SiO_2)_Y] \cdot Z\ H_2O$$

in which $M^1$ represents an alkali metal ion or an alkaline earth metal ion or hydrogen ion having a valence of $n_1$; $M^2$ is at least one metal ion selected from the group consisting of $Ti^{4+}$, $Zr^{4+}$ and $Sn^{4+}$ having a valence of $n_2$; $n_1A + n_2B = X$ and $Y/X \geq 5$; the $M^2$ ion being contained in an amount of 0.1–20% by weight based on the zeolite;

(B) at least one metal or an oxide of a metal selected from the group consisting of Ru, Rh and Ag supported on the substituted zeolite; and optionally (C) at least one metal or an oxide of a metal selected from the group consisting of Pd and Pt supported on the substituted zeolite; the metal or its oxide (B) and the metal or its oxide (C) being contained in a total amount of 0.1–10% by weight based on the zeolite.

5. The catalyst as claimed in claim 4 which further comprises at least one oxide selected from the group consisting of $TiO_2$ and $SnO_2$ supported on the zeolite in an amount of 0.1–20% by weight in terms of metal based on the zeolite.

6. A catalyst for denitrizing nitrogen oxides in the presence of a hydrocarbon as a reducing agent, which comprises:

(A) a zeolite having the general formula $$M^1{}_A[(AlO_2)_x(SiO_2)_Y] \cdot Z\ H_2O$$

in which $M^1$ represents an alkali metal ion or an alkaline earth metal ion or hydrogen ion having a valence of $n_1$; $n_1A = X$; and $Y/X \geq 5$;

(B) at least one oxide selected from the group consisting of $TiO_2$, $ZrO_2$ and $SnO_2$ supported on the zeolite in an amount of 0.1–20% by weight in terms of metal based on the zeolite; and (C) at least one metal or an oxide of a metal selected from the group consisting of Pd and Pt supported on the substituted zeolite in an amount of 0.1–10% by weight based on the zeolite; and optionally (D) at least one metal or an oxide of a metal selected from the group consisting of Pd and Pt supported on the substituted zeolite; the metal or its oxide (C) and the metal or its oxide (D) being contained in a total amount of 0.1–10% by weight based on the zeolite.

7. A catalyst for denitrizing nitrogen oxides in the presence of a hydrocarbon as a reducing agent, which comprises:

(A) a substituted zeolite having the general formula $$M^1{}_A M^2{}_B[(AlO_2)_x(SiO_2)_Y]\cdot Z\ H_2O$$

in which $M^1$ represents an alkali metal ion or an alkaline earth metal ion or hydrogen ion having a valence of $n_1$; $M^2$ is at least one metal ion selected from the group consisting of $Ti^{4+}$, $Zr^{4+}$ and $Sn^{4+}$ having a valence of $n_2$; $n_1A+n_2B=X$ and $Y/X \geqq 5$; the $M^2$ ion being contained in an amount of 0.1–20% by weight based on the zeolite; and (B) at least one metal or an oxide of a metal selected from the group consisting of V, Cr, Mn, Fe, Co, Ni, Cu, Zn, Nb, Mo and W in an amount of 0.1–20% by weight based on the zeolite.

8. The catalyst as claimed in claim 7 which further comprises at least one oxide selected from the group consisting of $TiO_2$, $ZrO_2$ and $SnO_2$ supported on the zeolite in an amount of 0.1–20% by weight in terms of metal based on the zeolite; and 9. A catalyst for denitrizing nitrogen oxides in the presence of a hydrocarbon as a reducing agent, which comprises:

(A) a zeolite having the general formula $$M^1{}_A[(AlO_2)_x(SiO_2)_Y]\cdot Z\ H_2O$$

in which $M^1$ represents an alkali metal ion or an alkaline earth metal ion or hydrogen ion having a valence of $n_1$; $n_1A=X$; and $Y/X \geqq 5$;

(B) at least one oxide selected from the group consisting of $TiO_2$, $ZrO_2$ and $SnO_2$ supported on the zeolite in an amount of 0.1–20% by weight in terms of metal based on the zeolite; and (C) at least one metal or an oxide of a metal selected from the group consisting of V, Cr, Mn, Fe, Co, Ni, Cu, Zn, Nb, Mo and W in an amount of 0.1–10% by weight based on the zeolite.

* * * * *